United States Patent
Jyoti et al.

(10) Patent No.: US 11,245,273 B2
(45) Date of Patent: Feb. 8, 2022

(54) BATTERY SWAP SYSTEM FOR MOBILE STATIONS

(71) Applicant: STMicroelectronics Pte Ltd, Singapore (SG)

(72) Inventors: Prabhu Jyoti, Singapore (SG); Cho Seng Dominic Tay, Singapore (SG)

(73) Assignee: STMICROELECTRONICS PTE LTD, Singapore (SG)

( * ) Notice: Subject to any disclaimer, the term of this patent is extended or adjusted under 35 U.S.C. 154(b) by 215 days.

(21) Appl. No.: 16/282,097

(22) Filed: Feb. 21, 2019

(65) Prior Publication Data

US 2019/0273384 A1    Sep. 5, 2019

Related U.S. Application Data

(60) Provisional application No. 62/637,760, filed on Mar. 2, 2018.

(51) Int. Cl.
*H02J 7/00* (2006.01)
*H01M 50/10* (2021.01)
(Continued)

(52) U.S. Cl.
CPC .......... *H02J 7/0042* (2013.01); *H01M 10/46* (2013.01); *H01M 50/10* (2021.01); *H01M 50/20* (2021.01);
(Continued)

(58) Field of Classification Search
CPC ...... H02J 7/0042; H02J 7/0047; H02J 7/0029; H02J 7/0044; H02J 7/0045; H01M 10/46; H01M 10/44; H01M 50/204; H01M 50/207; H01M 50/10; H01M 50/20; H01M 50/256; H01M 2220/30; Y02E 60/10
See application file for complete search history.

(56) References Cited

U.S. PATENT DOCUMENTS 6,181,107 B1 * 1/2001 Hirose ................. H02J 7/0086
 320/134
6,377,020 B1 * 4/2002 Yokoyama ........... H01M 10/46
 320/106

(Continued)

FOREIGN PATENT DOCUMENTS

JP          2001230097 A  *  8/2001

*Primary Examiner* — Naum Levin
(74) *Attorney, Agent, or Firm* — Seed IP Law Group LLP

(57) ABSTRACT

A battery charging system includes a first electrical connector disposed facing a first shelf, a second electrical connector disposed facing a second shelf, a first charge device coupled to the first electrical connector, and a second charge device coupled to the second electrical connector. A mobile device includes a first electrical connector, a first shelf portion and a second shelf portion, which are facing the first electrical connector, and a third shelf portion and a fourth shelf portion, which are facing the second electrical connector. Each of the electrical connectors of the battery charging system and the mobile device includes a first conductor, a second conductor, and a third conductor, with the first conductor electrically coupled to the third conductor, and the second conductor electrically isolated from and disposed between the first and third conductors, which enable the battery charging system and mobile device to easily swap batteries.

22 Claims, 11 Drawing Sheets

(51) Int. Cl.
  *H01M 50/20*      (2021.01)
  *H01M 50/204*     (2021.01)
  *H01M 50/207*     (2021.01)
  *H01M 10/46*      (2006.01)

(52) U.S. Cl.
  CPC ....... *H01M 50/204* (2021.01); *H01M 50/207* (2021.01); *H02J 7/0021* (2013.01); *H02J 7/0027* (2013.01); *H02J 7/0047* (2013.01)

(56) References Cited

U.S. PATENT DOCUMENTS

| | | | | |
|---|---|---|---|---|
| 6,945,803 B2* | 9/2005 | Potega | ............... | G01R 31/36 439/218 |
| 7,157,882 B2* | 1/2007 | Johnson | ............... | H02J 7/0031 320/134 |
| 7,317,297 B1* | 1/2008 | Furlan | ............... | H01M 10/486 320/106 |
| 7,507,500 B2* | 3/2009 | Donnelly | ............... | B60L 58/22 429/99 |
| 7,725,138 B2* | 5/2010 | Herrera | ............... | H04B 1/3883 455/572 |
| 8,134,343 B2* | 3/2012 | Like | ............... | H05K 7/20518 320/166 |
| 8,664,913 B2* | 3/2014 | Chuan | ............... | H02J 7/00047 320/107 |
| 8,729,865 B2* | 5/2014 | Scheucher | ............... | B60L 53/305 320/134 |
| 8,822,067 B2* | 9/2014 | Johnson | ............... | H02J 7/0014 429/161 |
| 8,823,321 B2* | 9/2014 | Dvorkin | ............... | G01R 31/378 320/113 |
| 8,872,474 B2* | 10/2014 | Scheucher | ............... | H01M 50/20 320/112 |
| 9,153,978 B2* | 10/2015 | Reade | ............... | H02J 7/0047 |
| 9,178,193 B2* | 11/2015 | Ahn | ............... | A61B 8/56 |
| 9,276,418 B2* | 3/2016 | Kawasaki | ............... | H02J 7/0027 |
| 9,478,785 B2* | 10/2016 | Larsen | ............... | H01M 50/502 |
| 9,748,777 B2* | 8/2017 | Owen | ............... | H02J 7/0021 |
| 9,806,318 B2* | 10/2017 | Holtappels | ............... | H01M 50/20 |
| 9,847,654 B2* | 12/2017 | Beaston | ............... | H02J 7/342 |
| 10,183,563 B2* | 1/2019 | Rayner | ............... | H02J 7/0042 |
| 10,348,114 B2* | 7/2019 | Rippel | ............... | H02J 7/0063 |
| 10,412,853 B2* | 9/2019 | Dombrowski | ............... | G06F 1/1632 |
| 10,800,267 B2* | 10/2020 | Radin | ............... | B60L 53/60 |
| 2006/0164788 A1* | 7/2006 | Eisenring | ............... | H01G 9/155 361/301.5 |
| 2006/0170391 A1* | 8/2006 | Lam | ............... | H01M 8/04626 320/101 |
| 2009/0181290 A1* | 7/2009 | Baldwin | ............... | H01M 50/209 429/100 |
| 2010/0292877 A1* | 11/2010 | Lee | ............... | B60L 53/80 701/21 |
| 2013/0216867 A1* | 8/2013 | Schaefer | ............... | H01M 10/02 429/7 |
| 2013/0234666 A1* | 9/2013 | Lei | ............... | H01M 10/44 320/111 |
| 2015/0244194 A1* | 8/2015 | Tabuchi | ............... | H02J 7/0042 320/107 |
| 2015/0263394 A1* | 9/2015 | Yoshioka | ............... | H01M 10/425 429/90 |
| 2019/0157885 A1* | 5/2019 | Rippel | ............... | H02M 1/32 |
| 2019/0273226 A1* | 9/2019 | Qiu | ............... | A24F 40/40 |

\* cited by examiner

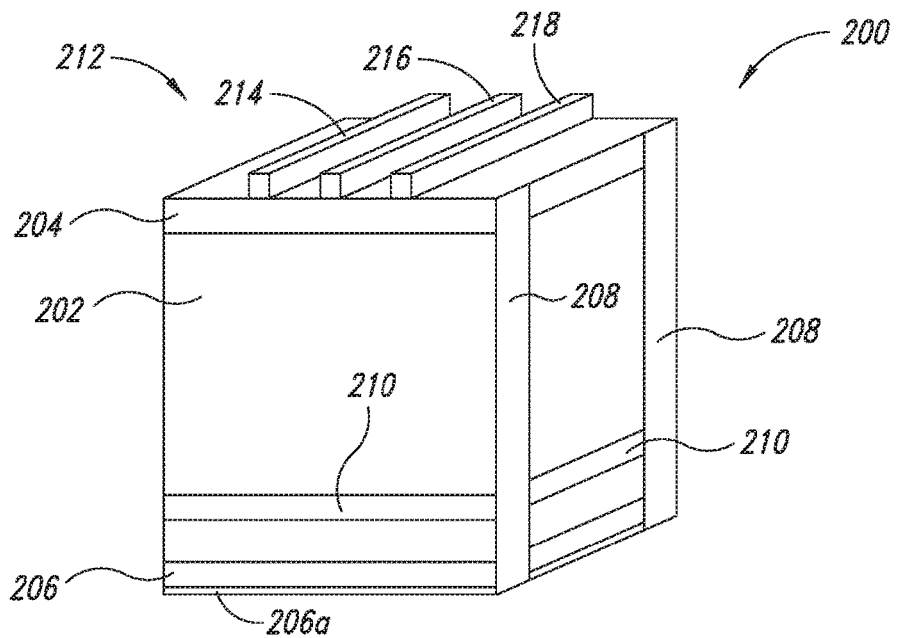
FIG. 5A
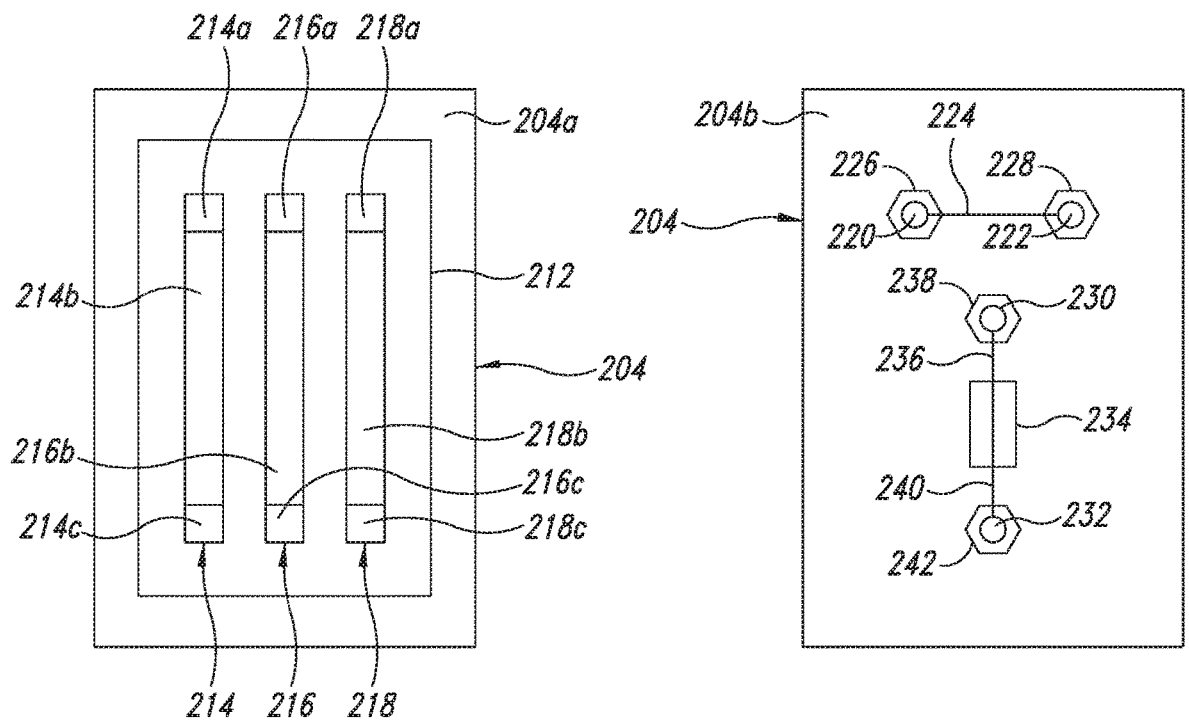
FIG. 5B
FIG. 5C

BATTERY SWAP SYSTEM FOR MOBILE STATIONS

BACKGROUND

Technical Field

The present disclosure relates to portable electronic devices. More particularly, the present disclosure relates to portable electronic devices having removable batteries that are rechargeable, and charging devices that charge such batteries.

Description of the Related Art

Rechargeable batteries of some conventional portable electronic devices can be recharged in-situ. For example, a battery charger may be plugged into a power outlet that supplies an alternating current (AC), and circuitry within the battery charger may convert the AC current into a direct current (DC), which is supplied to a battery of a portable electronic device via a charging cable. This approach may be inconvenient for a user of the portable electronic device because the portable electronic device must remain connected to the charging cable while the battery is being charged. Additionally, this approach may result in low utilization of the portable electronic device if it not practical to use the portable electronic device while its battery is being recharged.

Rechargeable batteries of some conventional portable electronic devices can be recharged while they are removed from the portable electronic devices. For example, a user may remove a first battery that requires charging from a portable electronic device and install a second battery that is charged in place of the first battery. This approach may not be practical if the first battery is difficult for a user to remove from the portable electronic device. Additionally, this approach may not be practical if the first and the second batteries are heavy and are difficult for a user to lift.

BRIEF SUMMARY

The present disclosure solves the above problems by providing a mobile device that enables a user to easily swap a first battery that requires recharging with a second battery that is charged, without requiring the user to lift the first and the second batteries.

A battery charging system may be summarized as including: a first electrical connector including a first conductor, a second conductor, and a third conductor, wherein the first conductor is electrically coupled to the third conductor, and the second conductor is electrically isolated from and disposed between the first and third conductors; a second electrical connector including a first conductor, a second conductor, and a third conductor, wherein the first conductor is electrically coupled to the third conductor, and the second conductor is electrically isolated from and disposed between the first and third conductors; a first shelf disposed facing the first electrical connector; a second shelf disposed facing the second electrical connector; a first charge device configured to provide a charging voltage to the second conductor of the first electrical connector; and a second charge device configured to provide the charging voltage to the second conductor of the second electrical connector.

The first conductor of the first electrical connector, the second conductor of the first electrical connector, the third conductor of the first electrical connector, the first conductor of the second electrical connector, the second conductor of the second electrical connector, and the third conductor of the second electrical connector may be parallel. The first and third conductors of the first electrical connector and the first and third conductors of the second electrical connector may be electrically coupled to a reference potential.

The battery charging system may further include: a battery case having a first lid on which a third electrical connector is disposed, the third electrical connector including a first conductor, a second conductor, and a third conductor, wherein the first conductor is electrically coupled to the third conductor, and the second conductor is electrically isolated from and disposed between the first and third conductors, and wherein the first and third conductors of the third electrical connector are electrically coupled to a first terminal of a battery, and the second conductor of the third electrical connector is electrically coupled to a second terminal of the battery.

When the battery case is disposed at a predetermined position on the first shelf, the first conductor of the third electrical connector may contact the first conductor of the first electrical connector, the second conductor of the third electrical connector may contact the second conductor of the first electrical connector, and the third conductor of the third electrical connector may contact the third conductor of the first electrical connector, and when the battery case is disposed at a predetermined position on the second shelf, the first conductor of the third electrical connector may contact the first conductor of the second electrical connector, the second conductor of the third electrical connector may contact the second conductor of the second electrical connector, and the third conductor of the third electrical connector may contact the third conductor of the second electrical connector. The battery case may include a second lid including a surface formed from Teflon, the battery being disposed on the second lid over the surface formed from Teflon. A width of the first shelf may be less than a width of the second lid, and a width of the second shelf may be less than the width of the second lid.

The battery charging system may further include: a first sensor electrically coupled to at least one of the conductors of the first electrical connector, wherein the first sensor electrically couples the at least one of the conductors of the first electrical connector to the first charge device when the first sensor is in a first state, and does not electrically couple the at least one of the conductors of the first electrical connector to the first charge device when the first sensor is in a second state; and a second sensor electrically coupled to at least one of the conductors of the second electrical connector, wherein the second sensor electrically couples the at least one of the conductors of the second electrical connector to the second charge device when the second sensor is in a first state, and does not electrically couple the at least one of the conductors of the first electrical connector to the second charge device when the second sensor is in a second state.

The first sensor may be in the first state when a battery is disposed at a predetermined position on the first shelf, and the first sensor may be in the second state when the battery is not disposed at the predetermined position on the first shelf, and the second sensor may be in the first state when the battery is disposed at a predetermined position on the second shelf, and the second sensor may be in the second state when the battery is not disposed at the predetermined position on the second shelf.

A mobile device may be summarized as including: a first electrical connector including a first conductor, a second conductor, and a third conductor, wherein the first conductor is electrically coupled to the third conductor, and the second conductor is electrically isolated from and disposed between the first and third conductors; a second electrical connector including a first conductor, a second conductor, and a third conductor, wherein the first conductor is electrically coupled to the third conductor, and the second conductor is electrically isolated from and disposed between the first and third conductors; a first shelf portion and a second shelf portion that is spaced apart from the first shelf portion by a predetermined distance, the first shelf portion and the second shelf portion being disposed facing the first electrical connector; and a third shelf portion and a fourth shelf portion that is spaced apart from the third shelf portion by the predetermined distance, the third shelf portion and the fourth shelf portion being disposed facing the second electrical connector.

The mobile device may further include a battery lock disposed between the second shelf portion and the third shelf portion, the battery lock configured to selectively retain a battery on one of the first shelf portion and the second shelf portion, or retain the battery on the third shelf portion and the fourth shelf portion.

The battery lock may include a rod that is pivotally mounted between the second shelf portion and the third shelf portion; the battery lock may also include a first lever and a second lever mounted to the rod, when the first lever is in a first position, the battery lock may retain the battery on the first shelf portion and the second shelf portion, and when the first lever is in a second position, the battery lock may retain the battery on the third shelf portion and the fourth shelf portion. The first conductor of the first electrical connector, the second conductor of the first electrical connector, the third conductor of the first electrical connector, the first conductor of the second electrical connector, the second conductor of the second electrical connector, and the third conductor of the second electrical connector may be parallel. The first conductor of the first electrical connector, the second conductor of the first electrical connector, the third conductor of the first electrical connector, the first conductor of the second electrical connector, the second conductor of the second electrical connector, and the third conductor of the second electrical connector, the first shelf portion, the second shelf portion, the third shelf portion, and the fourth shelf portion may be parallel. The first and third conductors of the first electrical connector, and the first and third conductors of the second electrical connector may be electrically coupled together.

The mobile device may further include a plurality of wheels supporting the first electrical connector, the second electrical connector, the first shelf portion, the second shelf portion, the third shelf portion, and the fourth shelf portion.

The mobile device may further include a first shelf supported by the wheels, wherein the first electrical connector, the second electrical connector, the first shelf portion, the second shelf portion, the third shelf portion, and the fourth shelf portion are suspended from the first shelf.

The first shelf may have a first end and a second end, and the first shelf portion, the second shelf portion, the third shelf portion, and the fourth shelf portion may be centered between the first end and the second end of the first shelf.

The mobile device may further include an electronic device electrically coupled to the first connector and the second connector.

The mobile device may further include an image sensor communicatively coupled to the electronic device, wherein the electronic device is a computer.

BRIEF DESCRIPTION OF THE SEVERAL VIEWS OF THE DRAWINGS

FIG. 5A is a perspective view of a battery case, according to one or more embodiments of the present disclosure.

FIG. 5B is a top view of an upper lid of the battery case, according to one or more embodiments of the present disclosure.

FIG. 5C is a bottom view of the upper lid of the battery case, according to one or more embodiments of the present disclosure.

DETAILED DESCRIPTION

Figure 1A:
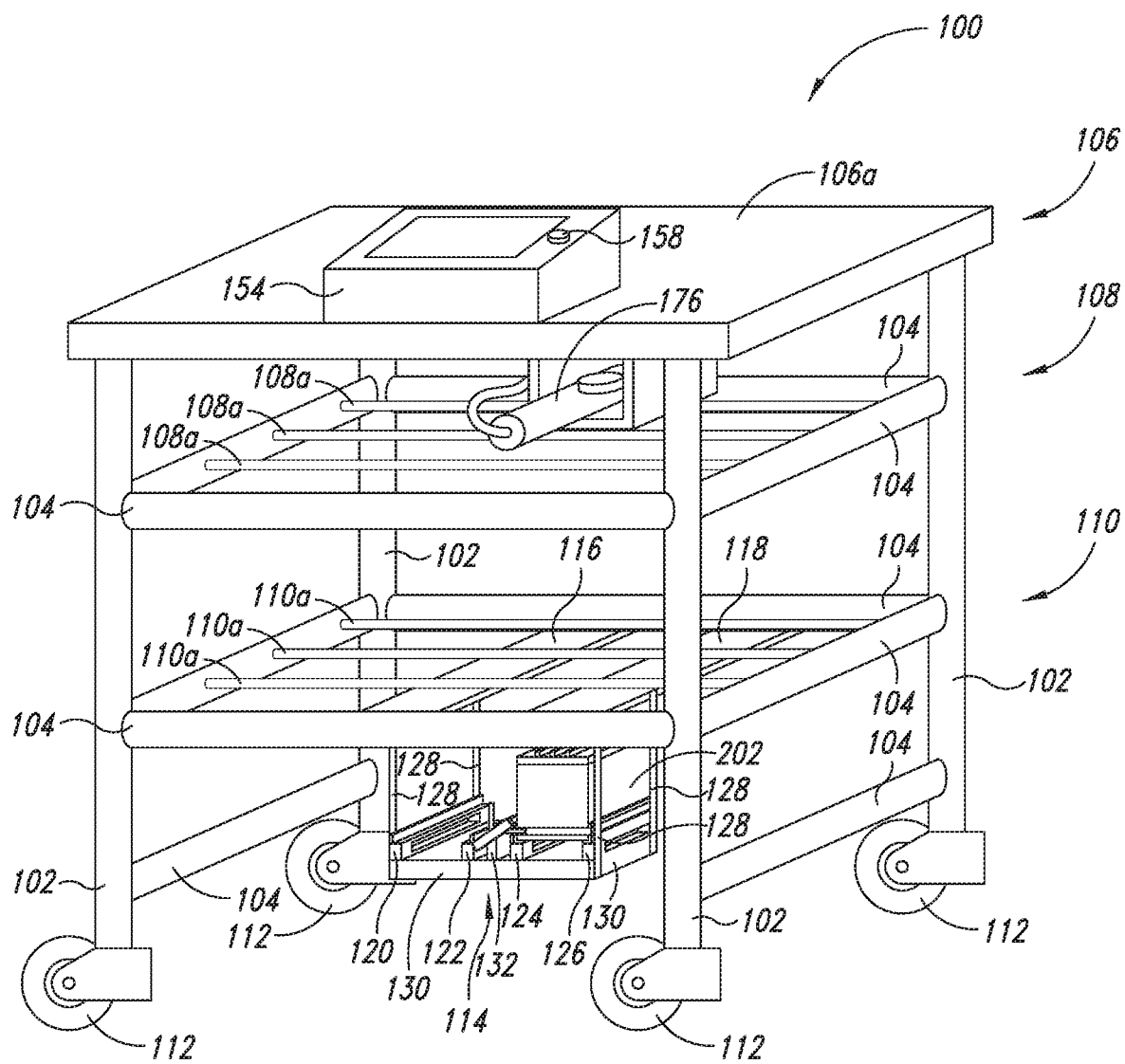
FIG. 1A is a perspective view of a mobile device, according to one or more embodiments of the present disclosure.
Figure 1B:
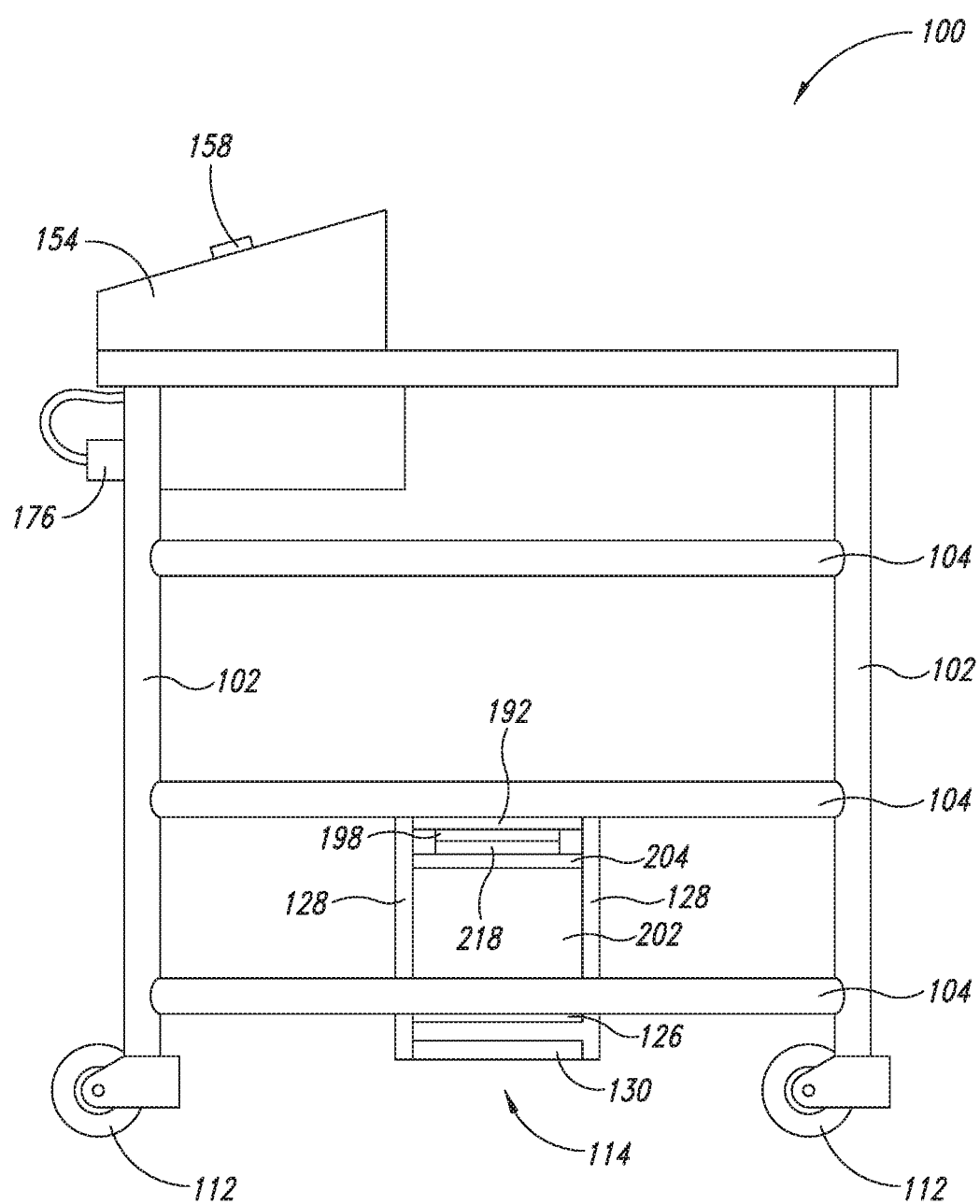
FIG. 1B is a side view of the mobile device, according to one or more embodiments of the present disclosure.
Figure 1C:
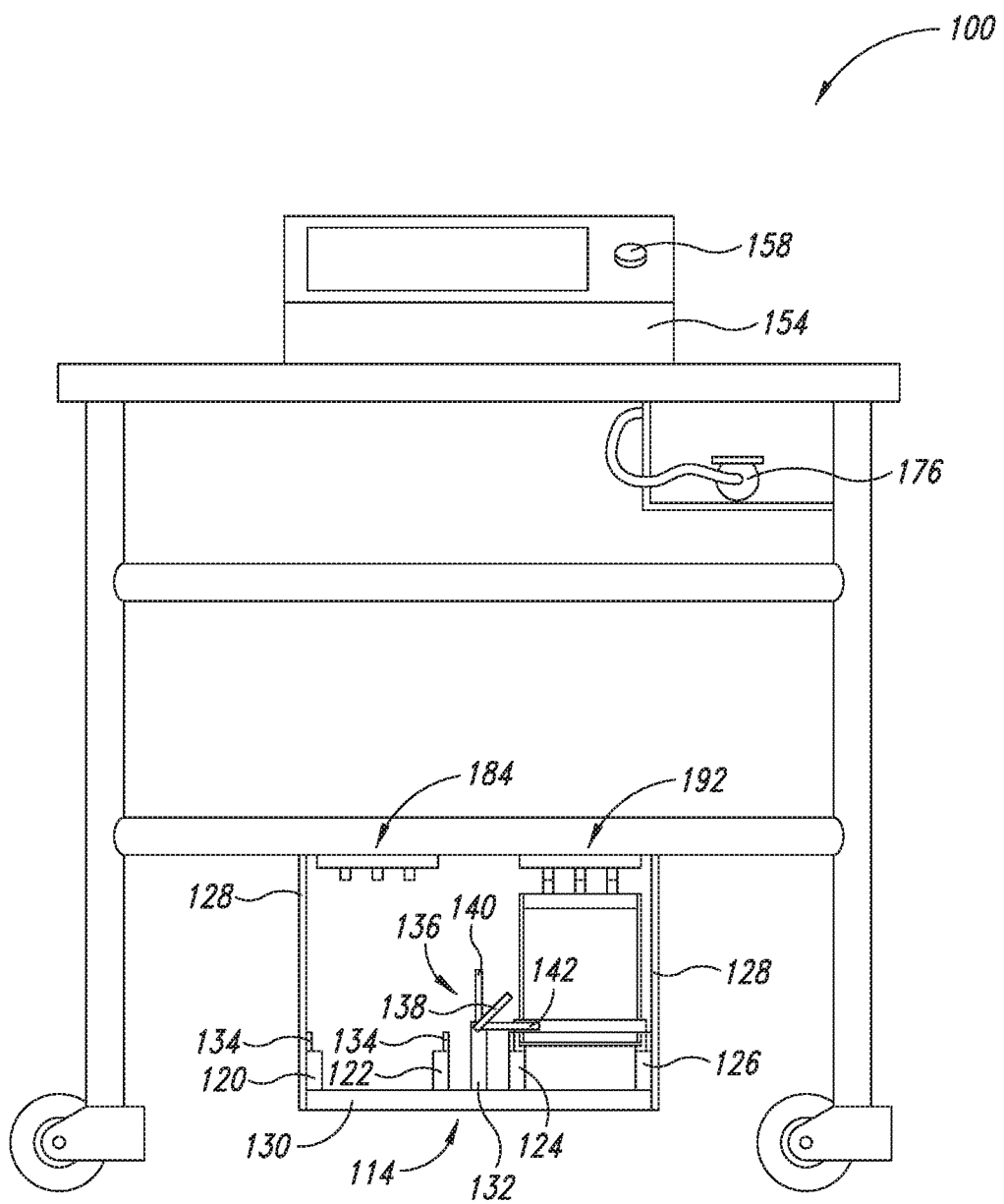
FIG. 1C is a front view of the mobile device, according to one or more embodiments of the present disclosure.
Figure 1D:
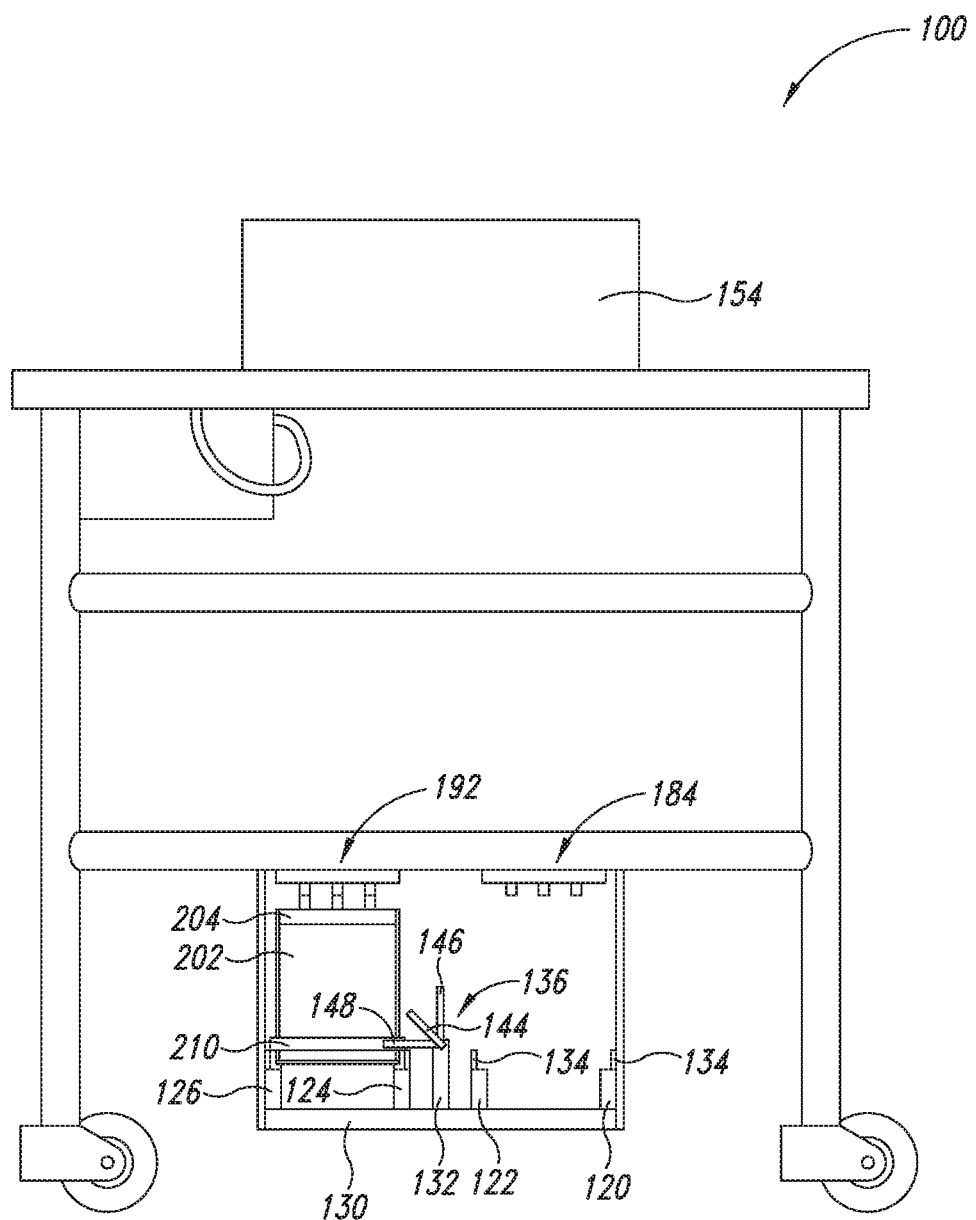
FIG. 1D is a rear view of the mobile device, according to one or more embodiments of the present disclosure.

FIG. 1A is a perspective view of a mobile device or mobile electronic station or 100, according to one or more embodiments of the present disclosure. FIG. 1B is a side view of the mobile electronic station 100, according to one or more embodiments of the present disclosure. FIGS. 1C and 1D are front and rear views, respectively, of the mobile electronic station 100, according to one or more embodiments of the present disclosure.

The mobile electronic station 100 includes a plurality of vertical support posts 102 and a plurality of horizontal support posts 104. In one or more embodiments, the vertical support posts 102 and the horizontal support posts 104 are formed from stainless steel and are welded together to provide a support structure or frame for the mobile electronic station 100.

The mobile electronic station 100 also includes an upper shelf 106, a middle shelf 108, and a lower shelf 110. In one or more embodiments, the upper shelf 106 is formed from a sheet of stainless steel 106a that is attached (e.g., welded) to the tops of the vertical support posts 102. In one or more embodiments, the middle shelf 108 is formed from a plurality of stainless steel rods 108a, wherein one end of each of the rods 108a is attached (e.g., welded) to a first one of the horizontal support posts 104 and the other end of each of the rods 108a is attached (e.g., welded) to a second one of the horizontal support posts 104. In one or more embodiments, the lower shelf 110 is formed from a plurality of stainless steel rods 110a, wherein one end of each of the rods 110a is attached (e.g., welded) to a third one of the horizontal support posts 104 and the other end of each of the rods 110a is attached (e.g., welded) to a fourth one of the horizontal support posts 104.

Although the mobile electronic station 100 shown in FIG. 1A includes three shelves, the mobile electronic station 100 may have a different number of shelves, without departing from the scope of the present disclosure. In addition, for illustrative simplicity, the middle shelf 108 shown in FIG. 1A includes three rods 108a; however, the middle shelf 108 may include a different number of rods 108a or a sheet of material (e.g., stainless steel), without departing from the scope of the present disclosure. Similarly, for illustrative simplicity, the lower shelf 110 shown in FIG. 1A includes three rods 110a; however, the lower shelf 110 may include a different number of rods 110a or a sheet of material (e.g., stainless steel), without departing from the scope of the present disclosure.

The mobile electronic station 100 also includes a plurality of wheels 112. In one or more embodiments, a wheel 112 is mounted below each of the of vertical support posts 102. The wheels 112 enable a user to move (e.g., push, pull) the mobile electronic station 100 to different locations. In one or more embodiments, each wheel 112 includes a caster that enables the wheel 112 to rotate about a vertical post that is inserted into an aperture formed in the bottom of one of the vertical support posts 102, which may make it easier for the user to steer the mobile electronic station 100.

A battery carriage 114 is suspended from the lower shelf 110. The battery carriage 114 includes a first mount plate 116, a second mount plate 118, a first battery shelf portion 120, a second battery shelf portion 122, a third battery shelf portion 124, a fourth battery shelf portion 126, a plurality of vertical frame members 128, a horizontal frame member 130, a lock mount member 132, and a plurality of rails 134. In one or more embodiments, each of the above-described components of the battery carriage 114 is formed from stainless steel.

In one or more embodiments, each of the first mount plate 116 and the second mount plate 118 has a rectangular shape. Each of the first mount plate 116 and the second mount plate 118 is attached (e.g., welded) to the rods 110A of the lower shelf 110. Assuming the mobile electronic station 100 is disposed on a level floor, the first mount plate 116 and the second mount plate 118 are parallel to the floor.

In one or more embodiments, two vertical frame members 128 are attached (e.g., welded) to the first mount plate 116, and two vertical frame members 128 are attached (e.g., welded) to the second mount plate 118. In addition, the horizontal frame member 130 has a rectangular shape. On one side of the mobile electronic station 100, the horizontal frame member 130 is attached (e.g., welded) to one of the vertical frame members 128 that is attached to the first mount plate 116, and is attached (e.g., welded) to one of the vertical frame members 128 that is attached to the second mount plate 118. Similarly, on the opposite side of the mobile electronic station 100, the horizontal frame member 130 is attached (e.g., welded) to one of the vertical frame members 128 that is attached to the first mount plate 116, and is attached (e.g., welded) to one of the vertical frame members 128 that is attached to the second mount plate 118.

The horizontal frame member 130 supports the first battery shelf portion 120, the second battery shelf portion 122, the third battery shelf portion 124, and the fourth battery shelf portion 126. More particularly, each of the first battery shelf portion 120, the second battery shelf portion 122, the third battery shelf portion 124, and the fourth battery shelf portion 126 is disposed on top of and is attached (e.g., welded) to the horizontal frame member 130. Each of the first battery shelf portion 120, the second battery shelf portion 122, the third battery shelf portion 124, and the fourth battery shelf portion 126 has an upper surface with a rectangular shape. The first battery shelf portion 120 and the second battery shelf portion 122 are parallel, are separated by a predetermined distance, which corresponds to the width of shelves 250 and 252 of a battery charging system 244 that is described below, and are capable of supporting a battery 202, as will be described below. Similarly, the third battery shelf portion 124 and the fourth battery shelf portion 126 are parallel, are separated by the predetermined distance, and are capable of supporting a battery 200, as will be described below. In one or more embodiments, a rail 134 is attached (e.g., welded) to one side of each of the first battery shelf portion 120, the second battery shelf portion 122, the third battery shelf portion 124, and the fourth battery shelf portion 126, which helps to ensure that any battery 202 disposed thereon does not slide off of the battery carriage 114 when the mobile electronic station 100 is being moved, for example.

The mobile electronic station 100 also includes a battery lock 136. As will be described in detail below with reference to FIGS. 4A to 4C, the battery lock 136 includes a first lever 138, a first engagement bar 140, a second engagement bar 142, a second lever 144, a third engagement bar 146, a fourth engagement bar 148, and a rod 150.

A housing 154 is mounted to the upper shelf 106 of the mobile electronic station 100. For example, the housing 154 is formed from stainless steel and is attached (e.g., welded) to the upper shelf 106 of the mobile electronic station 100. An electronic device, namely a computer 156, is disposed within the housing 154. A button 158 is mounted on the housing 154.

Figure 2:
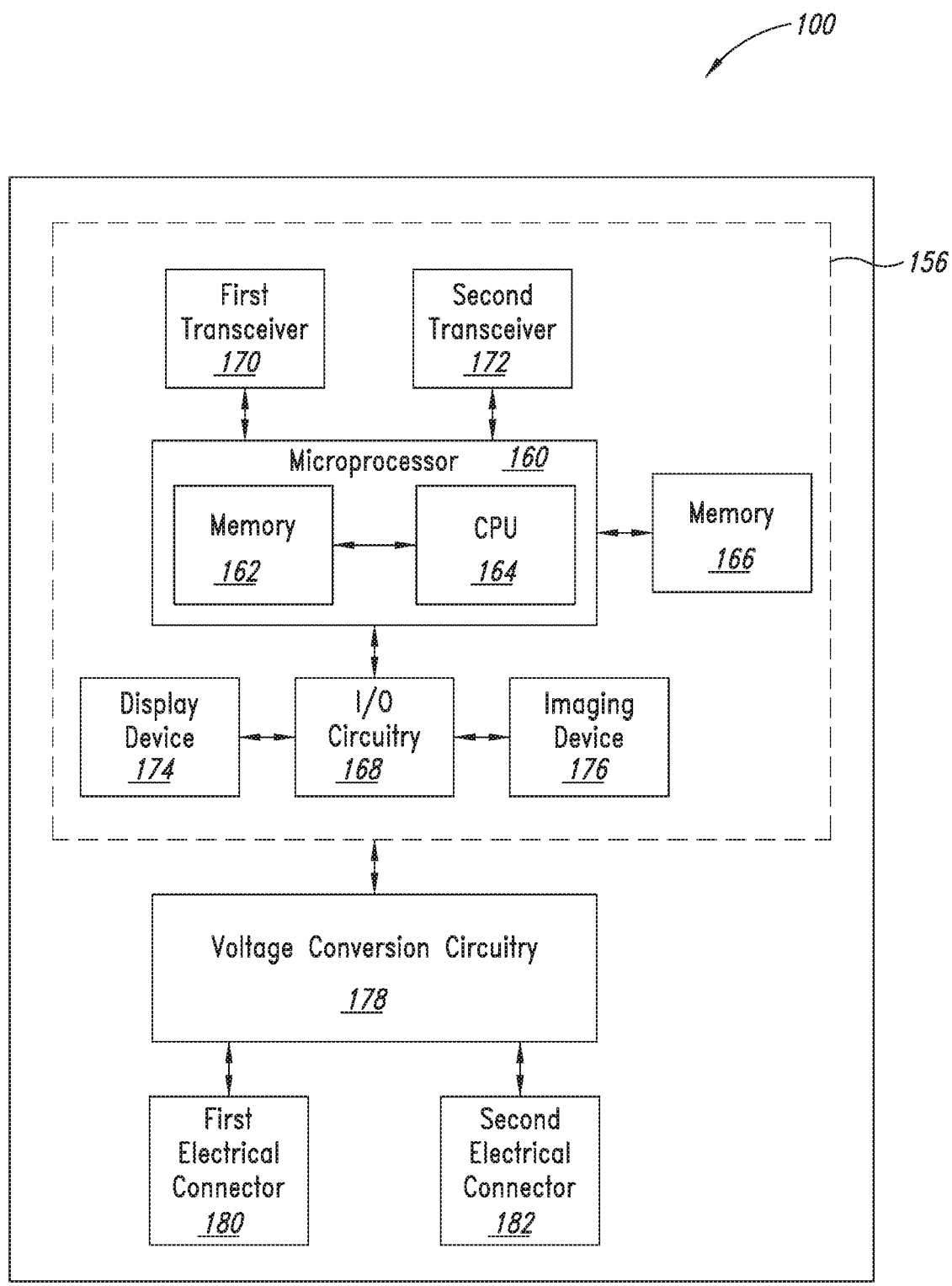
FIG. 2 is a block diagram of the mobile device, according to one or more embodiments of the present disclosure.

FIG. 2 is a block diagram of the mobile electronic station 100, according to one or more embodiments of the present disclosure. The mobile electronic station 100 includes the housing 154 that includes the computer 156, which includes a microprocessor 160 having a memory 162 and a central processing unit (CPU) 164, a memory 166, input/output (I/O) circuitry 168, a first transceiver 170, a second transceiver 172, a display device 174, and an imaging device 176. The mobile electronic station 100 also includes voltage conversion circuitry 178, a first electrical connector 180, and a second electrical connector 182.

In one or more embodiments, the microprocessor 160 is a Model BCM2837 quad core microprocessor available from Broadcom Limited, which is co-headquartered in San Jose, Calif. and Singapore. The memory 166 stores processor-executable instructions that, when executed by the CPU 164, cause the computer 156 to perform the functions described herein. The CPU 164 uses the memory 162 as a working memory while executing the instructions. In one or more embodiments, the memory 162 is comprised of one or more random access memory (RAM) modules. In one or more embodiments, the memory 162 is comprised of one or more non-volatile random access memory (NVRAM) modules, such as electronically erasable programmable read-only memory (EEPROM) or Flash memory modules, for example.

In one or more embodiments, the I/O circuitry 168 includes buttons (e.g., button 158), switches, dials, knobs, a touchscreen, or other user-interface elements for inputting commands to the computer 156. The I/O circuitry 168 also may include a speaker, one or more light emitting devices, or other user-interface elements for outputting information or indications from the computer 156. The I/O circuitry 168 includes one or more data interfaces, for example, a 40-pin extended general-purpose input/output (GPIO) interface, a universal serial bus (USB) interface, a stereo output and composite video port, a high-definition multimedia interface (HDMI), camera serial interface (CSI), display serial interface (DSI), and a micro secure digital slot (MicroSD slot).

In one or more embodiments, the first transceiver 170 is configured to transmit and receive radio frequency (RF) signals in accordance with the Bluetooth (registered trademark) communication standards. In one or more embodiments, the second transceiver 172 is configured to transmit and receive RF signals in accordance with the IEEE 802.11 AC communication standards. In one or more embodiments, the first transceiver 170 and the second transceiver 172 are included in a model BCM43438 single-chip IEEE 802.11ac b/g/n MAC/Baseband/Radio with Integrated Bluetooth 4.1 and FM receiver available from Broadcom Limited, which is co-headquartered in San Jose, Calif. and Singapore. The first transceiver 170 and the second transceiver 172 may be configured to transmit and receive RF signals in accordance with other communications standards without departing from the scope of the present disclosure.

In one or more embodiments, the display device 174 is a capacitive touchscreen device. For example, the display device 174 may be a model 8997466 7" touchscreen display device available from The Raspberry Pi Foundation in the United Kingdom.

In one or more embodiments, the imaging device 176 includes a camera and a processor that is configured to perform optical character recognition using image data captured by the camera and to output digital data corresponding to the image data. For example, the imaging device 176 is a model ST-5180 handheld scanner available from Shenzhen Barcode System Co., Ltd., which is based in Guangdong, China.

By way of another example, the imaging device 176 may be used to obtain image data corresponding to a label or bar code affixed to a package of materials used to produce semiconductor devices, and output digital data corresponding to the image data to the microprocessor 160. The memory 166 may store instructions that, when executed by the microprocessor 160, cause the microprocessor 160 to perform processes associated with a Manufacturing Execution Systems (MES), such as a Workstream(R) Open. Accordingly, the mobile electronic station 100 may be used to track and document the transformation of raw materials to finished goods in a semiconductor fabrication facility.

In one or more embodiments, the voltage conversion circuitry 178 includes a direct current (DC) to DC converter. For example, the voltage conversion circuitry 178 includes a model TEN 4-2411 DC/DC converter available from TRACO Electronic AG, which is based in Baar, Switzerland. In one or more embodiments, the voltage conversion circuitry 178 includes an alternating current (AC) to DC converter. For example, the voltage conversion circuitry 178 includes a model XP400I 400 W power inverter available from The Whistler Group, which is based in Bentonville, Ark.

Figure 3:
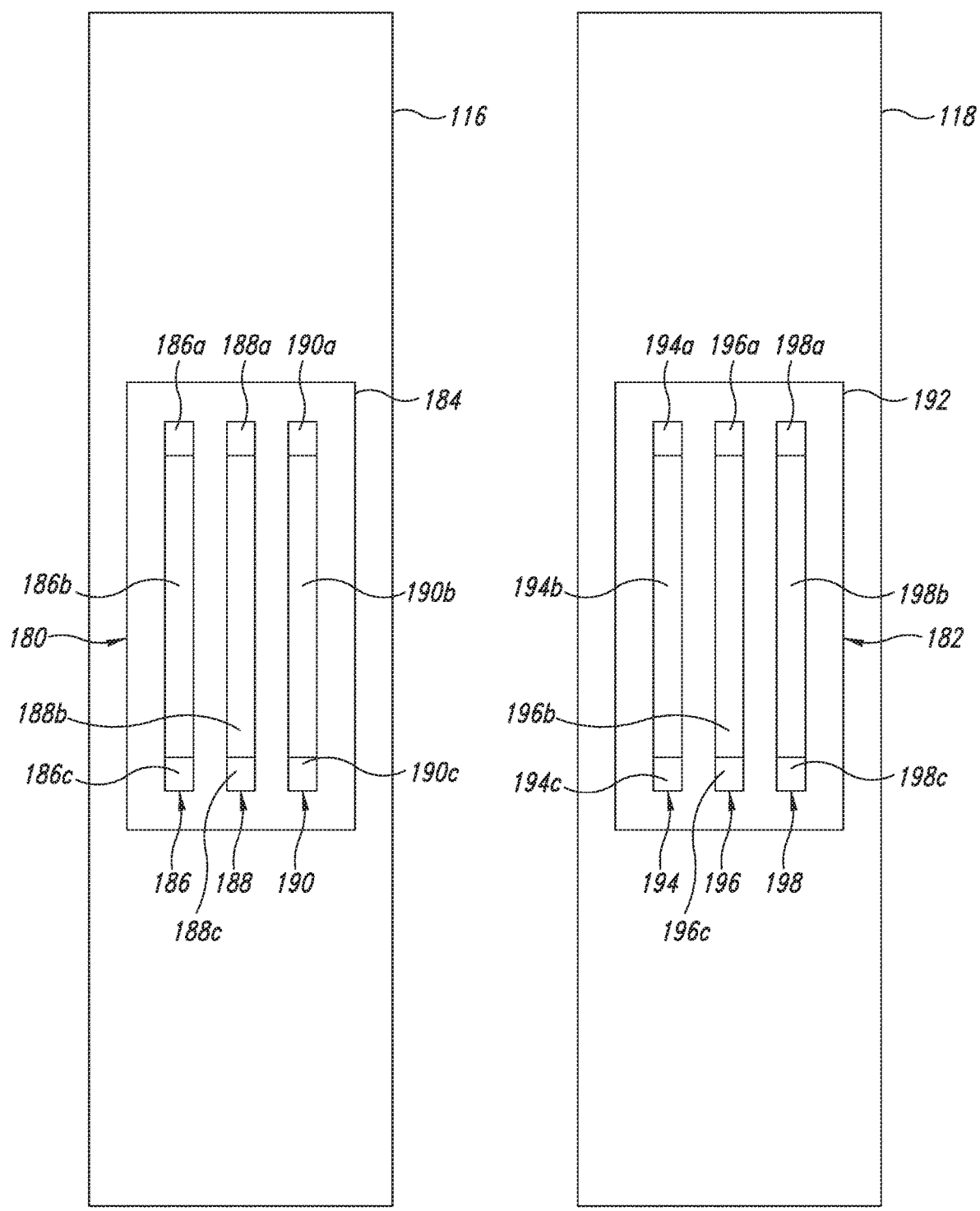
FIG. 3 is a plan view of a portion of the mobile device, according to one or more embodiments of the present disclosure.

The first electrical connector 180 and the second electrical connector 182 are described below with reference to FIG. 3. FIG. 3 shows the first mount plate 116 and the second mount plate 118, as viewed from the below the first mount plate 116 and the second mount plate 118, according to one or more embodiments of the present disclosure. The first electrical connector 180 is attached (e.g., welded, bolted) to the first mount plate 116, and the second electrical connector 182 is attached (e.g., welded, bolted) to the second mount plate 118.

The first electrical connector 180 includes a base plate 184, a first conductor 186, a second conductor 188, and a third conductor 190. The base plate 184 is formed from a non-conductive material, such as polyvinyl chloride (PVC), for example. Each of the first conductor 186, the second conductor 188, and the third conductor 190 is formed from a conductive material such as copper, for example.

The first conductor 186 is electrically coupled to the third conductor 190. For example, a portion (not shown) of each of the first conductor 186 and the third conductor 190 extends through the base plate 184 to the other side of the base plate 184 where they are electrically coupled together by a wire, which is coupled to a reference potential (e.g., ground) that is also coupled to a first terminal of the voltage conversion circuitry 178. The second conductor 188 is disposed between the first conductor 186 and the third conductor 190. The second conductor 188 is electrically isolated from the first conductor 186 and the third conductor 190. The second conductor 188 is electrically coupled to a second terminal of voltage conversion circuitry 178. For example, a portion (not shown) of the second conductor 188 extends through the base plate 184 to the other side of the base plate 184 where it coupled to the second terminal of the voltage conversion circuitry 178 by a wire (not shown).

In one or more embodiments, the first conductor 186 includes a first portion 186a, a second portion 186b, and a third portion 186c. The first portion 186a and the third portion 186c may be angled with respect to a surface of the base plate 184 such that the second portion 186b is spaced apart from the surface of the base plate 184 so that the second portion 186b can move slightly when another electrical connector similar to the first electrical connector 180 is placed in contact with the first electrical connector 180, as will be described below. This feature helps to ensure the first conductor 186 makes an electrical connection with a corresponding conductor of the other electrical connector. The second conductor 188 includes a first portion 188a, a second portion 188b, and a third portion 188c, which are arranged in a manner similar to the first portion 186a, the second portion 186b, and the third portion 186c, as described above. In addition, the third conductor 190 includes a first portion 196a, a second portion 196b, and a third portion 196c, which are arranged in a manner similar to the first portion 186a, the second portion 186b, and the third portion 186c, as described above.

In one or more embodiments, the first conductor 186, the second conductor 188, and the third conductor 190 are mounted on an exterior surface of the base plate 184. For example, they are mounted such that exterior surfaces of the second portion 186b of the first conductor 186, the second portion 188b of second conductor 188, and the second portion 190b of the third conductor 190 are parallel and coplanar.

In one or more embodiments, the first conductor 186, the second conductor 188, and the third conductor 190 are mounted on projections (not shown) that move with respect to the base plate 184. For example, the base plate 184 includes three rectangular apertures, and each projection has a corresponding rectangular shape and a predetermined thickness, wherein one side of the projection includes one or more outwardly extending flanges that prevent the projection from passing completely through the apertures in the base plate 184. One or more springs, for example, may be disposed between the first mount plate 116 and the projections, wherein the springs exert elastic forces on the projections such that the second portion of the first conductor 186*b*, the second portion of the second conductor 188*b*, and the second portion of the third conductor 190*b* are biased away from the base plate 184. Such embodiments also may cause the exterior surfaces of the second portion 186*b* of the first conductor 186, the second portion 188*b* of second conductor 188, and the second portion 190*b* of the third conductor 190 to be parallel and coplanar.

The second electrical connector 182 is configured in a similar manner as the first electrical connector 180. More particularly, the second electrical connector 182 includes a base plate 192, a first conductor 194, a second conductor 196, and a third conductor 198. The base plate 192 is formed from a non-conductive material, such PVC, for example. Each of the first conductor 194, the second conductor 196, and the third conductor 198 is formed from a conductive material such as copper, for example.

The first conductor 194 is electrically coupled to the third conductor 198. For example, a portion (not shown) of each of the first conductor 194 and the third conductor 198 extends through the base plate 192 to the other side of the base plate 192 where they are electrically coupled together by a wire, which is coupled to a reference potential (e.g., ground) that is also coupled to a first terminal of the voltage conversion circuitry 178. The second conductor 196 is disposed between the first conductor 194 and the third conductor 198. The second conductor 196 is electrically isolated from the first conductor 194 and the third conductor 198. The second conductor 196 is electrically coupled to a second terminal the voltage conversion circuitry 178. For example, a portion (not shown) of the second conductor 196 extends through the base plate 192 to the other side of the base plate 192 where it coupled to the second terminal of the voltage conversion circuitry 178 by a wire.

In one or more embodiments, the first conductor 194 includes a first portion 194*a*, a second portion 194*b*, and a third portion 194*c*. The first portion 194*a* and the third portion 194*c* may be angled with respect to a surface of the base plate 192 such that the second portion 194*b* is spaced apart from the surface of the base plate 192 so that the second portion 194*b* can move slightly when another electrical connector similar to the second electrical connector 182 is placed in contact with the second electrical connector 182, as will be described below. This feature helps to ensure the first conductor 194 makes an electrical connection with a corresponding conductor of the other electrical connector. The second conductor 196 includes a first portion 196*a*, a second portion 196*b*, and a third portion 196*c*, which are arranged in a manner similar to the first portion 194*a*, the second portion 194*b*, and the third portion 194*c*, as described above. In addition, the third conductor 198 includes a first portion 198*a*, a second portion 198*b*, and a third portion 198*c*, which are arranged in a manner similar to the first portion 194*a*, the second portion 194*b*, and the third portion 194*c*, as described above.

In one or more embodiments, the first conductor 194, the second conductor 196, and the third conductor 198 are mounted on an exterior surface of the base plate 192. For example, they are mounted such that exterior surfaces of the second portion 194*b* of the first conductor 194, the second portion 196*b* of second conductor 196, and the second portion 198*b* of the third conductor 198 are parallel and coplanar.

In one or more embodiments, the first conductor 194, the second conductor 196, and the third conductor 198 are mounted on projections (not shown) that move with respect to the base plate 192. For example, the base plate 192 includes three rectangular apertures, and each projection has a corresponding rectangular shape and a predetermined thickness, wherein one side of the projection includes one or more outwardly extending flanges that prevent the projection from passing completely through the apertures in the base plate 192. One or more springs, for example, may be included between the second mount plate 118 and the projections, wherein the springs exert elastic forces on the projections such that the second portion of the first conductor 194*b*, the second portion of the second conductor 196*b*, and the second portion of the third conductor 198*b* are biased away from the base plate 192. Such embodiments also may cause the exterior surfaces of the second portion 194*b* of the first conductor 194, the second portion 196*b* of second conductor 196, and the second portion 198*b* of the third conductor 198 to be parallel and coplanar.

Figures 4A, 4B, 4C:
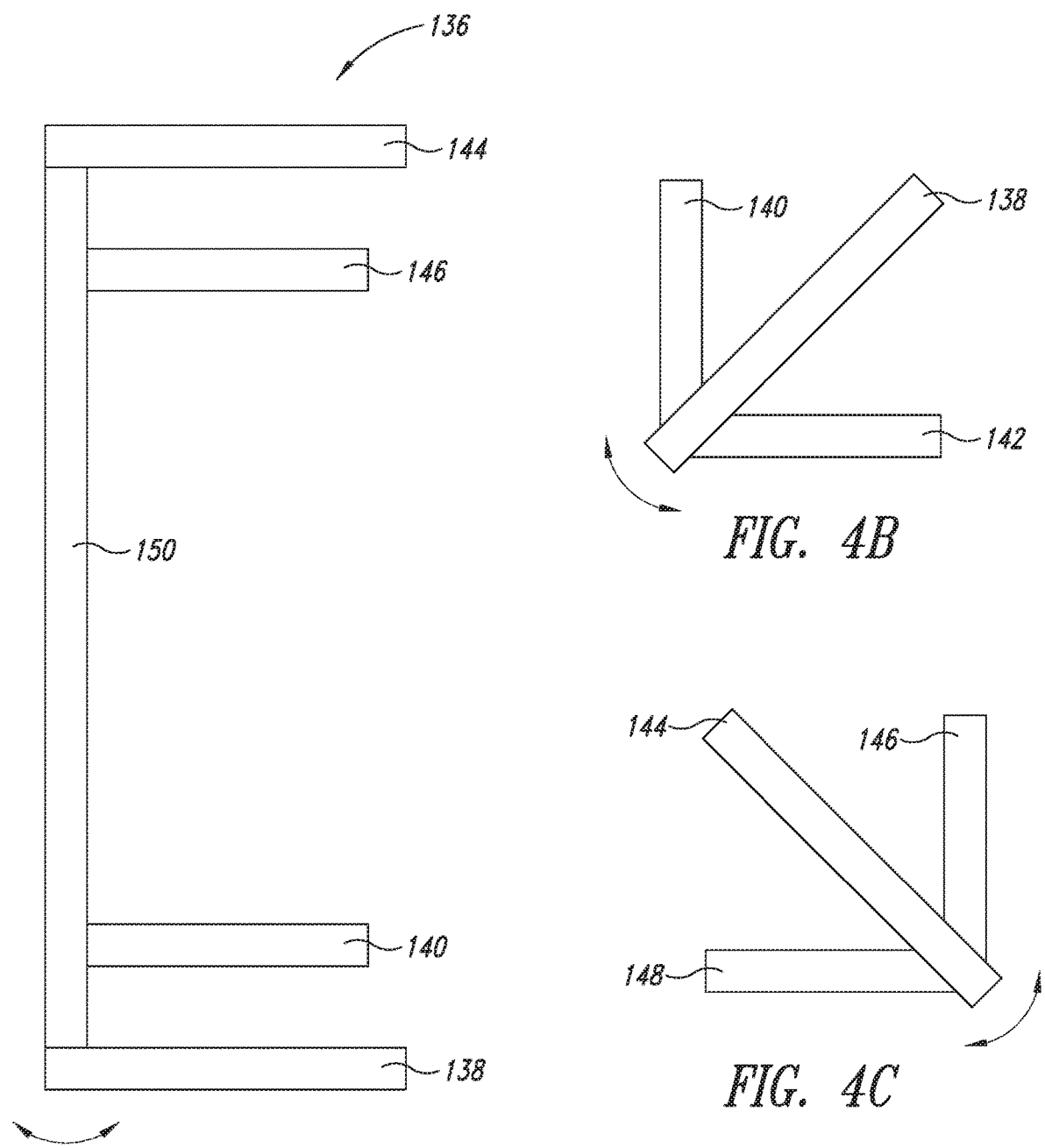
FIG. 4A is a top view of a battery lock of the mobile device, according to one or more embodiments of the present disclosure.
FIG. 4B is a front view of the battery lock of the mobile device, according to one or more embodiments of the present disclosure.
FIG. 4C is a rear view of the battery lock of the mobile device, according to one or more embodiments of the present disclosure.

FIG. 4A is a top view of a battery lock 136 of the mobile electronic station 100, according to one or more embodiments of the present disclosure. FIG. 4B is a front view of the battery lock 136. FIG. 4C is a rear view of the battery lock 136. As mentioned previously, the battery lock 136 includes a first lever 138, a first engagement bar 140, a second engagement bar 142, a second lever 144, a third engagement bar 146, a fourth engagement bar 148, and a rod 150.

In one or more embodiments, each of the components of the battery lock 136 is formed from stainless steel. The first lever 138, the first engagement bar 140, the second engagement bar 142, the second lever 144, the third engagement bar 146, and the fourth engagement bar 148 are attached (e.g., welded) to the rod 150 are various rotational angles. The first lever 138 is parallel to the second lever 144; the first engagement bar 140 is parallel to the third engagement bar 146; and the second engagement bar 142 is parallel to the fourth engagement bar 148. The rod 150 is pivotally mounted to the lock mount member 132.

For example, opposite ends of the lock mount member 132 include an aperture formed therethrough in which the rod 150 is disposed. The lock mount member 132 is disposed between the first engagement bar 140 and the second engagement bar 142 on one side of the lock mount member 132, and the third engagement bar 146 and the fourth engagement bar 148 on the opposite side of the lock mount member 132. The rod 150 is pivotally mounted to the lock mount member 132 such that movement of the first lever 138 or the second lever 144 causes the rod 150 to rotate, which causes the other components of the battery lock 136 to rotate as well.

In one or more embodiments, a first end of the lock mount member 132 includes a pair of projections (not shown) that extend from the lock mount member 132 toward the first lever 138. The projections are positioned such that, when the rod 150 is rotated by a predetermined amount in a first direction, the second engagement bar 142 comes into contact with one of the projections and prevents further rotation of the rod 150, which causes the battery lock 136 to be in a first position. In addition, the projections are positioned such that, when the rod 150 is rotated by a predetermined amount in a second direction, the first engagement bar 140 comes into contact with the other one of the projections and prevents further rotation of the rod 150, which causes the battery lock 136 to be in a second position.

Additionally or alternatively, a second end of the lock mount member 132 includes a pair of projections (not shown) that extend from the lock mount member 132 toward the second lever 144. The projections are positioned such that, when the rod 150 is rotated by a predetermined amount in a first direction, the fourth engagement bar 148 comes into contact with one of the projections and prevents further rotation of the rod 150, which causes the battery lock 136 to be in a first position. In addition, the projections are positioned such that, when the rod 150 is rotated by a predetermined amount in a second direction, the first third engagement bar 146 comes into contact with the other one of the projections and prevents further rotation of the rod 150, which causes the battery lock 136 to be in a second position.

The battery lock 136 is arranged such that, when a battery 202 is placed on the first battery shelf portion 120 and the second battery shelf portion 122, and the battery lock 136 is in first position, the battery 202 is disposed between the first engagement bar 140 and the third engagement bar 146, which prevents the battery 202 from moving off the first battery shelf portion 120 and the second battery shelf portion 122. In other words, the battery 202 is sandwiched between the first engagement bar 140 and the third engagement bar 146. In addition, the battery lock 136 is arranged such that, when a battery 202 is placed on the third battery shelf portion 124 and the fourth battery shelf portion 126, and the battery lock 136 is in a second position, the battery 202 is disposed between the second engagement bar 142 and the fourth engagement bar 148, which prevents the battery 202 from moving off the third battery shelf portion 124 and the fourth battery shelf portion 126. In other words, the battery 202 is sandwiched between the second engagement bar 142 and the fourth engagement bar 148. Accordingly, the battery lock 136 is configured to selectively lock a battery 202 on either the first battery shelf portion 120 and the second battery shelf portion 122, or the third battery shelf portion 124 and the fourth battery shelf portion 126.

FIG. 5A is a perspective view of the battery case 200, according to one or more embodiments of the present disclosure. The battery case 200 includes a battery 202, an upper lid 204, a lower lid 206, vertical frame members 208, horizontal frame members 210, and an electrical connector 212. In one or more embodiments, the battery 202 is a 12 volt battery, for example, a Model ETX18C 12V battery available from EarthX, Inc., which is based in Windsor, Colo.

The upper lid 204 has a rectangular shape and is formed from a non-conductive material, such as PVC, for example. The lower lid 206 also has a rectangular shape and is formed a non-conductive material, such as PVC, for example. At least a lower surface 206a of the lower lid 206 is formed from a material having a relative small coefficient of friction, such as Teflon™, for example. The lower surface 206a of the lower lid 206 enables the battery case 200 to easily slide over shelves on which it is placed, as will be explained further below.

In one or more embodiments, the vertical frame members 208 and horizontal frame members 210 are formed from stainless steel. Four vertical frame members 208 and four horizontal frame members 210 are used to form a support structure for the upper lid 204 and the lower lid 206. More particularly, a first end of each of the vertical frame members 208 is attached (e.g., bolted) to the upper lid 204 near a corner thereof, and a second end of each of the vertical frame members 208 is attached (e.g., bolted) to the lower lid 206 near a corresponding corner thereof. The horizontal frame members 210 are provided on four sides of the battery case 200, wherein each horizontal frame member 210 is attached (e.g., welded, bolted) to a pair of adjacent vertical frame members 208, to increase the structural integrity of the battery case 200. In one or more embodiments, the horizontal frame members 210 are integrally formed.

FIG. 5B is a top view of the upper lid 204 of the battery case 200, according to one or more embodiments of the present disclosure. The electrical connector 212 is disposed on an upper surface 204a of the upper lid 204. The electrical connector 212 includes a first conductor 214, a second conductor 216, and a third conductor 218. Each of the first conductor 214, the second conductor 216, and the third conductor 218 is formed from a conductive material such as copper, for example.

In one or more embodiments, the first conductor 214 includes a first portion 214a, a second portion 214b, and a third portion 214c. The first portion 214a and the third portion 214c may be angled with respect to a surface of the upper lid 204 such that the second portion 214b is spaced apart from the surface of the upper lid 204 so that the second portion 214b can move slightly when another electrical connector similar to the electrical connector 212 is placed in contact with the electrical connector 212, as will be described below. This feature helps to ensure the first conductor 214 makes an electrical connection with a corresponding conductor of the other electrical connector. The second conductor 216 includes a first portion 216a, a second portion 216b, and a third portion 216c, which are arranged in a manner similar to the first portion 214a, the second portion 214b, and the third portion 214c, as described above. In addition, the third conductor 218 includes a first portion 218a, a second portion 218b, and a third portion 218c, which are arranged in a manner similar to the first portion 214a, the second portion 214b, and the third portion 214c, as described above.

In one or more embodiments, the first conductor 214, the second conductor 216, and the third conductor 218 are mounted on the upper surface 204a of the upper lid 204. For example, they are mounted such that exterior surfaces of the second portion 214b of the first conductor 214, the second portion 216b of second conductor 216, and the second portion 218b of the third conductor 218 are parallel and coplanar.

In one or more embodiments, the first conductor 214, the second conductor 216, and the third conductor 218 are mounted on projections (not shown) that move with respect to the upper lid 204. For example, the upper lid 204 includes three rectangular apertures, and each projection has a corresponding rectangular shape and a predetermined thickness, wherein one side of the projection includes one or more outwardly extending flanges that prevent the projection from passing completely through the apertures in the upper lid 204. One or more springs, for example, may be included between the upper lid 204 and the projections, wherein the springs exert elastic forces on the projections such that the second portion of the first conductor 214b, the second portion of the second conductor 216b, and the second portion of the third conductor 218b are biased away from the upper lid 204. Such embodiments also may cause the exterior surfaces of the second portion 214b of the first conductor 214, the second portion 216b of second conductor 216, and the second portion 218b of the third conductor 218 to be parallel and coplanar.

FIG. 5C is a bottom view of the upper lid 204 of the battery case 200, according to one or more embodiments of the present disclosure. In one or more embodiments, a first threaded post 220 formed from a conductive material (e.g., copper) is in electrical contact with the first conductor 214 on the upper side 204a of the upper lid 204, and extends through the upper lid 204 to a lower side 204b thereof. A second threaded post 222 formed from a conductive material (e.g., copper) is in electrical contact with the third conductor 218 on the upper side 204a of the upper lid 204, and extends through the upper lid 204 to the lower side 204b thereof. A wire 224 is secured to the first threaded post 220 and the second threaded post 222 using a first nut 226 and a second nut 228, thereby electrically coupling the first conductor 214 and the third conductor 218. In addition, a first terminal (e.g., negative terminal) of the battery 202 is electrically coupled to the first threaded post 220 using a wire (not shown) and the nut 226 or electrically coupled to the second threaded post 222 using a wire (not shown) and the nut 228, thereby electrically coupling the first terminal of the battery 202 to the first conductor 214 and the third conductor 218.

A third threaded post 230 formed from a conductive material (e.g., copper) is in electrical contact with the second conductor 216 on the upper side 204a of the upper lid 204, and extends through the upper lid 204 to a lower side 204b thereof. A fourth threaded post 232 formed from a conductive material (e.g., copper) extends outwardly form the lower side thereof; the fourth threaded post 232 is not electrically coupled to any of the conductors 214, 216, and 218 on the upper side 204a of the upper lid 204. A fuse 234 is electrically coupled between the third threaded post 230 and the fourth threaded post 232. More particularly, a wire 236 that is electrically coupled to a first terminal of the fuse 234 is attached to the third threaded post 230 using a nut 238, and a wire 240 that is electrically coupled to a second terminal of the fuse 234 is attached to the fourth threaded post 232 using a nut 242. In addition, a second terminal (e.g., positive terminal) of the battery 202 is electrically coupled to the fourth threaded post 232 using a wire (not shown) and the nut 242, thereby electrically coupling the second terminal of the battery 202 to the second conductor 216. If the first conductor 214 and the second conductor 216 of the electrical connector 212 were accidentally shorted together, for example, the fuse 234 would blow and prevent damage to the battery 202.

Figure 6A:
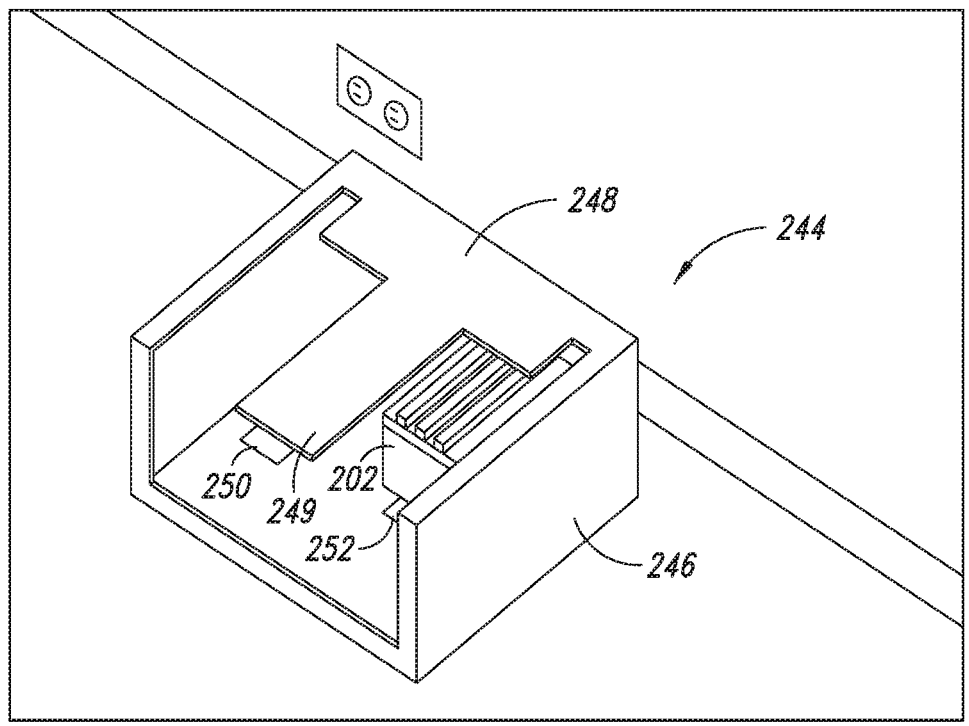
FIG. 6A is a perspective view of a battery charging system, according to one or more embodiments of the present disclosure.

FIG. 6A is a perspective view of a battery charging system 244, according to one or more embodiments of the present disclosure. The battery charging system 244 includes a housing 246, a lid 248 that includes an extension 249, a first battery shelf 250, and a second battery shelf 252. When the battery charging system 244 and the mobile electronic station 100 are disposed on a level floor, upper surfaces of the first battery shelf 250 and the second battery shelf 252 are level with upper surfaces of the first battery shelf portion 120, the second battery shelf portion 122, the third battery shelf portion 124, and the fourth battery shelf portion 126 of the mobile electronic station 100.

In one or more embodiments, the housing 246, the lid 248, the first battery shelf 250, and the second battery shelf 252 are formed from stainless steel. In one or more embodiments, distal ends of the first battery shelf 250 and the second battery shelf 252 are attached (e.g., welded, bolted) to an interior surface or other support structure at the back of the housing 246 such that the first battery shelf 250 and the second battery shelf 252 are cantilevered from the back of the housing 246. In one or more embodiments, upper surfaces of the first battery shelf 250 and the second battery shelf 252 are covered with a material such as PVC, for example.

A width of the first shelf 250 is less than a width of the second lid 206 of the battery case 204, and a width of the second shelf 202 is less than the width of the second lid 206 of the battery case 204. The width of the first shelf 250 is the same as the width of the second shelf 252. The width of the first shelf 250 and the width of the second lid 206 enable side, peripheral portions of the second lid 206 of the battery case 204 that extend past the sides of the first shelf 250 to be supported by the first battery shelf portion 120 and the second battery shelf portion 122 of the mobile electronic station 100, or supported by the third battery shelf portion 124 and the fourth battery shelf portion 126 of the mobile electronic station 100, as will be described below. Similarly, the width of the second shelf 252 and the width of the second lid 206 enable side, peripheral portions of the second lid 206 of the battery case 204 that extend past the sides of the second shelf 252 to be supported by the first battery shelf portion 120 and the second battery shelf portion 122 of the mobile electronic station 100, or supported by the third battery shelf portion 124 and the fourth battery shelf portion 126 of the mobile electronic station 100, as will be described below.

Figure 7:
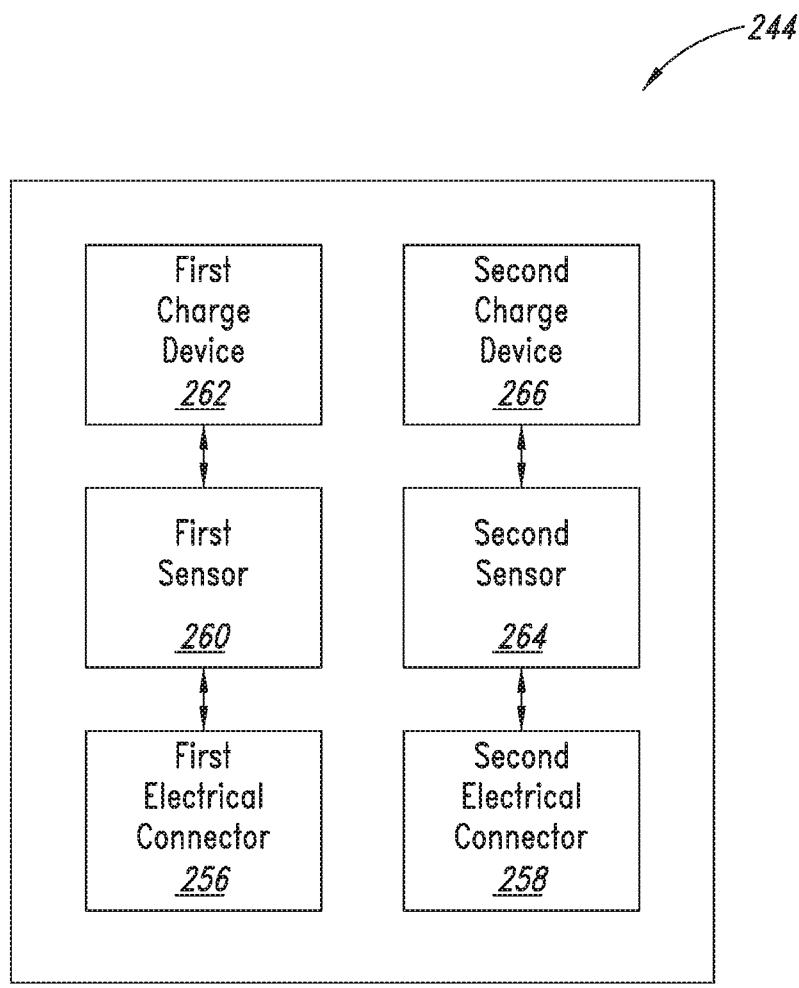
FIG. 7 is a block diagram of the battery charging system, according to one or more embodiments of the present disclosure.

FIG. 7 is a block diagram of the battery charging system 244, according to one or more embodiments of the present disclosure. The first electrical connector 256 is coupled to a first sensor 260, which is coupled to a first charge device 262. In addition, the second electrical connector 258 is coupled to a second sensor 264, which is coupled to a second charge device 266. In one or more embodiments, the first sensor 260 and the second sensor 264 are conventional limit switches. In one or more embodiments, each of the first charge device 262 and the second charge device 266 is a Model TM-471 battery charger available from OptiMATE based in Ontario, Canada.

Figure 8:
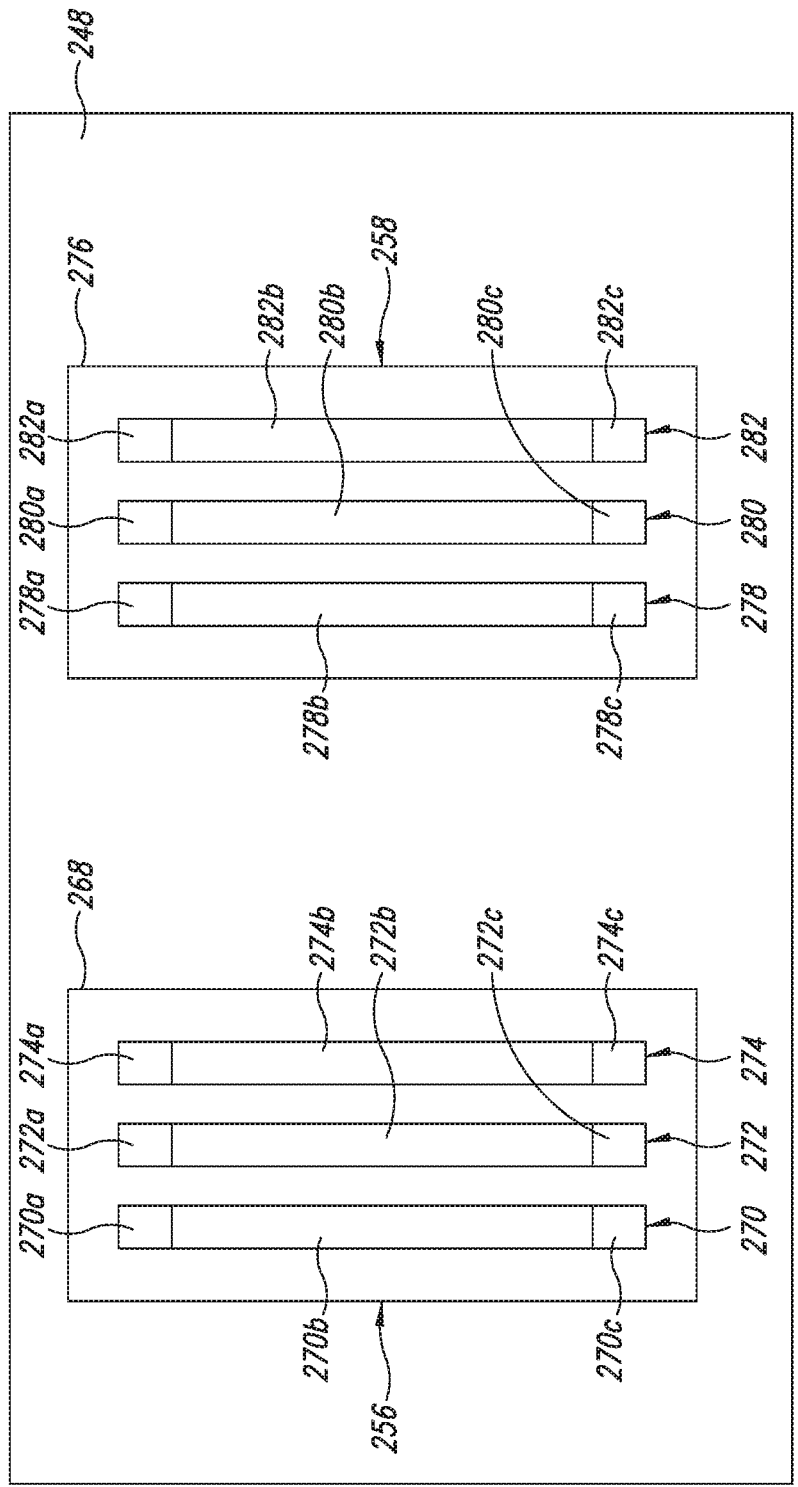
FIG. 8 is a plan view of a portion of the battery charging system, according to one or more embodiments of the present disclosure.

FIG. 8 is a plan view of the lid 248, as viewed from below the lid 248, according to one or more embodiments of the present disclosure. The first electrical connector 256 and the second electrical connector 258 are attached (e.g., welded, bolted) to a lower surface of the lid 248. The first electrical connector 256 is disposed facing the first shelf 250, and the second electrical connector 258 is disposed facing the second shelf 252.

The first electrical connector 256 includes a base plate 268, a first conductor 270, a second conductor 272, and a third conductor 274. The base plate 268 is formed from a non-conductive material, such as PVC, for example. Each of the first conductor 270, the second conductor 272, and the third conductor 274 is formed from a conductive material such as copper, for example. The first conductor 270, the second conductor 272, and the third conductor 274 of the first electrical connector 256 are mechanically parallel to each other, and are also parallel to the first shelf 250 and the second shelf 252, which are mechanically parallel to each other.

The first conductor 270 is electrically coupled to the third conductor 274. For example, a portion (not shown) of each of the first conductor 270 and the third conductor 274 extends through the base plate 268 to the other side of the base plate 268 where they are electrically coupled together by a wire, which is coupled to a reference potential (e.g., ground) that is also coupled to a first terminal of the voltage conversion circuitry 178 by a wire (not shown). The second conductor 272 is disposed between the first conductor 270 and the third conductor 274. The second conductor 272 is electrically isolated from the first conductor 270 and the third conductor 274.

The first conductor 270 and the third conductor 274 are electrically coupled to the first charge device 262 by a wire (not shown). For example, a portion (not shown) of each the first conductor 270 and the third conductor 274 extends through the base plate 268 to the other side of the base plate 268 where it coupled to a negative terminal of the first charge device 262 by one or more wires (not shown). The second conductor 272 is selectively, electrically coupled to the first charge device 262. For example, a portion (not shown) of the second conductor 272 extends through the base plate 268 to the other side of the base plate 268 where it electrically coupled to a first terminal of the first sensor 260, which has a second terminal that is electrically coupled to a positive terminal of the first charge device 262, which provides a charging voltage to the second conductor 272 of the first connector 256.

The first sensor 260 is disposed on, or adjacent to, the first shelf 250. When a battery case 200, and thus a battery 202, is disposed at a predetermined position of the first shelf 250, the first conductor 214, the second conductor 216, and the third conductor 218 of the electrical connector 212 of the battery case 200 respectively contact the first conductor 270, the second conductor 272, and the third conductor 274 of the first electrical connector 256 of the battery charging system 244. Alternatively, when the battery case 200 is rotated 180 degrees and is disposed at the predetermined position of the first shelf 250, the first conductor 214, the second conductor 216, and the third conductor 218 of the electrical connector 212 of the battery case 200 respectively contact the third conductor 274, the second conductor 272, and the first conductor 270 of the first electrical connector 256 of the battery charging system 244. Thus, appropriate electrical connections can be established between the electrical connector 212 of the battery case 200 and the first electrical connector 256 of the battery charging system 244 when the battery case 200 is oriented at a first orientation, and when the battery case 200 is rotated 180 degrees from the first orientation. Accordingly, appropriate electrical connections can be established between the electrical connector 212 of the battery case 200 and the first electrical connector 256 of the battery charging system 244 when the font end of the mobile electronic station 100 is adjacent the back of the housing 246, and when the rear end of the mobile electronic station 100 is adjacent the back of the housing 246. This would not be possible if the battery case 200 and the first electrical connector 256 included conventional electrical connectors.

When the battery case 200 is disposed at the predetermined position of the first shelf 250, the first sensor 260 is in a first state in which the first sensor 260 electrically couples the second conductor 272 to the positive terminal of the first charge device 262. When the battery case 200 is not disposed at the predetermined position of the first shelf 250, the first sensor 260 is in a second state in which the first sensor 260 does not electrically couple the second conductor 272 to the positive terminal of the first charge device 262. Accordingly, the first sensor 260 prevents the first charge device 262 from charging the battery 202 when it is not correctly positioned on the first shelf 250.

In one or more embodiments, the first conductor 270 includes a first portion 270a, a second portion 270b, and a third portion 270c. The first portion 270a and the third portion 270c may be angled with respect to a surface of the base plate 268 such that the second portion 270b is spaced apart from the surface of the base plate 268 so that the second portion 270b can move slightly when another electrical connector similar to the first electrical connector 256 is placed in contact with the first electrical connector 256, as will be described below. This feature helps to ensure the first conductor 270 makes an electrical connection with a corresponding conductor of the other electrical connector. The second conductor 272 includes a first portion 272a, a second portion 272b, and a third portion 272c, which are arranged in a manner similar to the first portion 270a, the second portion 270b, and the third portion 270c, as described above. In addition, the third conductor 274 includes a first portion 280a, a second portion 280b, and a third portion 280c, which are arranged in a manner similar to the first portion 270a, the second portion 270b, and the third portion 270c, as described above.

In one or more embodiments, the first conductor 270, the second conductor 272, and the third conductor 274 are mounted on an exterior surface of the base plate 268. For example, they are mounted such that exterior surfaces of the second portion of the first conductor 270b, the second portion of second conductor 272b, and the second portion of the third conductor 274b are parallel and coplanar.

In one or more embodiments, the first conductor 270, the second conductor 272, and the third conductor 274 are mounted on projections (not shown) that move with respect to the base plate 268. For example, the base plate 268 includes three rectangular apertures, and each projection has a corresponding rectangular shape and a predetermined thickness, wherein one side of the projection includes one or more outwardly extending flanges that prevent the projection from passing completely through the apertures in the base plate 268. One or more springs, for example, may be included between the lid 148 and the projections, wherein the springs exert elastic forces on the projections such that the second portion of the first conductor 270b, the second portion of the second conductor 272b, and the second portion of the third conductor 274b are biased away from the base plate 268. Such embodiments also may cause the exterior surfaces of second portion of the first conductor 270b, the second portion of second conductor 272b, and the second portion of the third conductor 274b to be parallel and coplanar.

The second electrical connector 258 is configured in a similar manner as the first electrical connector 256. More particularly, the second electrical connector 258 includes a base plate 276, a first conductor 278, a second conductor 280, and a third conductor 282. The base plate 276 is formed from a non-conductive material, such PVC, for example. Each of the first conductor 278, the second conductor 280, and the third conductor 282 is formed from a conductive material such as copper, for example.

The first conductor 278 and the third conductor 282 are electrically coupled to the second charge device 266 by a wire (not shown). For example, a portion (not shown) of each the first conductor 278 and the third conductor 282 extends through the base plate 276 to the other side of the base plate 276 where it coupled to a negative terminal of the second charge device 266 by one or more wires (not shown). The second conductor 280 is selectively, electrically coupled to the second charge device 266. For example, a portion (not shown) of the second conductor 280 extends through the base plate 276 to the other side of the base plate 276 where it coupled to a first terminal of the second sensor 264, which has a second terminal that is electrically to a positive terminal of the second charge device 266.

The second sensor 264 is disposed on, or adjacent to, the second shelf 252. When a battery case 200, and thus a battery 202, is disposed at a predetermined position of the second shelf 252, the first conductor 214, the second conductor 216, and the third conductor 218 of the electrical connector 212 of the battery case 200 respectively contact the first conductor 278, the second conductor 280, and the third conductor 282 of the second electrical connector 258 of the battery charging system 244. Alternatively, when the battery case 200 is rotated 180 degrees and is disposed at the predetermined position of the second shelf 252, the first conductor 214, the second conductor 216, and the third conductor 218 of the electrical connector 212 of the battery case 200 respectively contact the third conductor 282, the second conductor 280, and the first conductor 278 of the second electrical connector 258 of the battery charging system 244. Thus, appropriate electrical connections can be established between the electrical connector 212 of the battery case 200 and the second electrical connector 258 of the battery charging system 244 when the battery case 200 is oriented at a first orientation, and when the battery case 200 is rotated 180 degrees from the first orientation. Accordingly, appropriate electrical connections can be established between the electrical connector 212 of the battery case 200 and the second electrical connector 258 of the battery charging system 244 when the font end of the mobile electronic station 100 is adjacent the back of the housing 246, and when the rear end of the mobile electronic station 100 is adjacent the back of the housing 246. This would not be possible if the battery case 200 and the second electrical connector 258 included conventional electrical connectors.

When the battery case 200 is disposed at the predetermined position of the second shelf 252, the second sensor 264 is in a first state in which the second sensor 264 electrically couples the second conductor 280 to the positive terminal of the second charge device 266, which provides a charging voltage to the second conductor 280 of the second connector 258. When the battery case 200 is not disposed at the predetermined position of the second shelf 252, the second sensor 264 is in a second state in which the second sensor 264 does not electrically couple the second conductor 280 to the positive terminal of the second charge device 266. Accordingly, the second sensor 264 prevents the second charge device 266 from charging the battery 202 when it is not correctly positioned on the second shelf 252.

In one or more embodiments, the first conductor 278 includes a first portion 278a, a second portion 278b, and a third portion 278c. The first portion 278a and the third portion 278c may be angled with respect to a surface of the base plate 276 such that the second portion 278b is spaced apart from the surface of the base plate 276 so that the second portion 278b can move slightly when another electrical connector similar to the second electrical connector 258 is placed in contact with the second electrical connector 258, as will be described below. This feature helps to ensure the first conductor 278 makes an electrical connection with a corresponding conductor of the other electrical connector. The second conductor 280 includes a first portion 280a, a second portion 280b, and a third portion 280c, which are arranged in a manner similar to the first portion 278a, the second portion 278b, and the third portion 278c, as described above. In addition, the third conductor 282 includes a first portion 282a, a second portion 282b, and a third portion 282c, which are arranged in a manner similar to the first portion 278a, the second portion 278b, and the third portion 278c, as described above.

In one or more embodiments, the first conductor 278, the second conductor 280, and the third conductor 282 are mounted on an exterior surface of the base plate 276. For example, they are mounted such that exterior surfaces of the second portion of the first conductor 278b, the second portion of second conductor 280b, and the second portion of the third conductor 282b are parallel and coplanar.

In one or more embodiments, the first conductor 278, the second conductor 280, and the third conductor 282 are mounted on projections (not shown) that move with respect to the base plate 276. For example, the base plate 276 includes three rectangular apertures, and each projection has a corresponding rectangular shape and a predetermined thickness, wherein one side of the projection includes one or more outwardly extending flanges that prevent the projection from passing completely through the apertures in the base plate 276. One or more springs, for example, may be included between the lid 248 and the projections, wherein the springs exert elastic forces on the projections such that the second portion of the first conductor 278b, the second portion of the second conductor 280b, and the second portion of the third conductor 282b are biased away from the base plate 276. Such embodiments also may cause the exterior surfaces of second portion of the first conductor 278b, the second portion of second conductor 280b, and the second portion of the third conductor 282b to be parallel and coplanar.

Figure 6B:
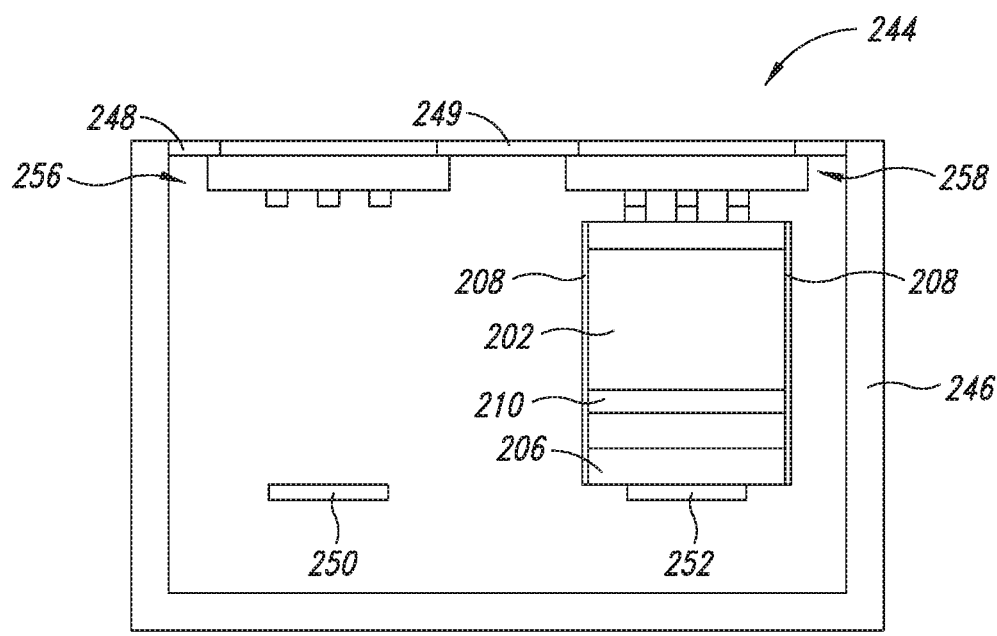
FIG. 6B is a front view of the battery charging system, according to one or more embodiments of the present disclosure.

Having described the structure of the mobile electronic station 100 and the battery charging system 244, use of the mobile electronic station 100 and the battery charging system 244 will now be described. By way of example, assume a first battery case 200 is disposed on the third battery shelf portion 124 and the fourth battery shelf portion 126 of the battery carriage 114 of the mobile electronic station 100, as shown in FIG. 1A, wherein a first battery 202 is disposed in the first battery case 200 and the first battery 202 requires charging. Also, assume a second battery case 200 is disposed on the second shelf 252 of the battery charging system 244, as shown in FIG. 6B, wherein a second battery 202 is disposed in the second battery case 200 and the second battery 202 is fully charged.

Because the first battery case 200 is disposed on the right side of the mobile electronic station 100, as viewed from a front end thereof (i.e., end with the housing 154), and the second battery case 200 is disposed on the right side of the battery charging system 244, a user of the mobile electronic station 100 must rotate the mobile electronic station 100 such that the front end thereof is facing away from the user, as shown in FIG. 1D. The user then moves the mobile electronic station 100 such that the font end thereof is in front of the battery charging system 244 and pushes the mobile electronic station 100 toward the battery charging system 244 until the third battery shelf portion 124 and the fourth battery shelf portion 126 of the mobile electronic station 100 are disposed on two sides of the first shelf 250 of the battery charging system 244, and the first battery shelf portion 120 and the second battery shelf portion 122 of the mobile electronic station 100 are disposed on two sides of the second shelf 252 of the battery charging system 244. In this position, side, peripheral portions of the first battery case 200 are disposed on the third battery shelf portion 124 and the fourth battery shelf portion 126 of the mobile electronic station 100, and a center portion of the first battery case 200 is disposed on the first shelf 250 of the battery charging system 244. Additionally, side, peripheral portions of the second battery case 200 are disposed on the first battery shelf portion 120 and the second battery shelf portion 122 of the mobile electronic station 100, and a center portion of the second battery case 200 is disposed on the second shelf 252 of the battery charging system 244.

Next, the user rotates the second lever 144 of the battery lock 136 in the clockwise direction, which causes the second lever 144 to move from a first position to a second position. When the second lever 144 is in the first position, as shown in FIG. 1D, the horizontal frame members 210 of the first battery case 200 are sandwiched between the fourth engagement bar 148 and the second engagement bar 142 of the battery lock 136, which causes the first battery case 200 to be locked or retained in the battery carriage 114 of the mobile electronic station 100. The clockwise rotation of the second lever 144 causes the first lever 138, the first engagement bar 140, the second engagement bar 142, the third engagement bar 146, and the fourth engagement bar 148 of the battery lock 136 to rotate in the clockwise direction. When the second lever 144 is in the second position, the horizontal frame members 210 of the first battery case 200 are no longer sandwiched between the fourth engagement bar 148 and the second engagement bar 142 of the battery lock 136, which causes the first battery case 200 to be unlocked or not retained in the battery carriage 114 of the mobile electronic station 100. Instead, the horizontal frame members 210 of the second battery case 200 are now sandwiched between the first engagement bar 140 and the third engagement bar 146 of the battery lock 136, which causes the second battery case 200 to be locked or retained in the battery carriage 114 of the mobile electronic station 100.

The user then pulls the mobile electronic station 100 away from the battery charging system 244. Because the first battery case 200 is not locked or retained in the battery carriage 114 of the mobile electronic station 100, the first battery case 200 remains on the first shelf 250 of the battery charging system 244 at the predetermined position that enables the first charge device 262 to charge the first battery 202, as discussed above. Because the second battery case 200 is locked or retained in the battery carriage 114 of the mobile electronic station 100, the second battery case 200 remains on the first battery shelf portion 120 and the second battery shelf portion 122 of the mobile electronic station 100 at the predetermined position where the first conductor 186 and the third conductor 190 of the first electrical connector 180 of the mobile electronic station 100 are coupled to the first conductor 214 and the third conductor 218 of the electrical connector 212 of the second battery case 200, and the second conductor 188 of the first electrical connector 180 of the mobile electronic station 100 is coupled to the second conductor 216 of the electrical connector 212 of the second battery case 200. Accordingly, the second battery 200 supplies electrical power to the voltage conversion circuitry 178, which supplies a predetermined voltage to the computer 156 thereby enabling the computer 156 to operate.

It is noted that, if the second battery case 200 were disposed on the first shelf 250, instead of the second shelf 252, a user operating the mobile electronic station 100 could simply move the mobile electronic station 100 such that the rear end thereof is in front of the battery charging system 244 and push the mobile electronic station 100 toward the battery charging system 244 until the first battery shelf portion 120 and the second battery shelf portion 122 of the mobile electronic station 100 are disposed on either side of the first shelf 250 of the battery charging system 244, and the third battery shelf portion 124 and the fourth battery shelf portion 126 of the mobile electronic station 100 are disposed on either side of the second shelf 252 of the battery charging system 244. In this position, side, peripheral portions of the first battery case 200 are disposed on the third battery shelf portion 124 and the fourth battery shelf portion 126 of the mobile electronic station 100, and a center portion of the first battery case 200 is disposed on the second shelf 252 of the battery charging system 244. Additionally, side, peripheral portions of the second battery case 200 are disposed on the first battery shelf portion 120 and the second battery shelf portion 122 of the mobile electronic station 100, and a center portion of the second battery case 200 is disposed on the first shelf 250 of the battery charging system 244.

Next, the user rotates the first lever 138 of the battery lock 136 in the counterclockwise direction, which causes the first lever 138 to move from a first position to a second position. When the first lever 138 is in the first position, as shown in FIG. 1C, the horizontal frame members 210 of the first battery case 200 are sandwiched between the fourth engagement bar 148 and the second engagement bar 142 of the battery lock 136, which causes the first battery case 200 to be locked or retained in the battery carriage 114 of the mobile electronic station 100. The counterclockwise rotation of the first lever 138 causes the second lever 144, the first engagement bar 140, the second engagement bar 142, the third engagement bar 146, and the fourth engagement bar 148 of the battery lock 136 to rotate in the counterclockwise direction. When the first lever 138 is in the second position, the horizontal frame members 210 of the first battery case 200 are no longer sandwiched between the fourth engagement bar 148 and the second engagement bar 142 of the battery lock 136, which causes the first battery case 200 to be unlocked or not retained in the battery carriage 114 of the mobile electronic station 100. Instead, the horizontal frame members 210 of the second battery case 200 are now sandwiched between the first engagement bar 140 and the third engagement bar 146 of the battery lock 136, which causes the second battery case 200 to be locked or retained in the battery carriage 114 of the mobile electronic station 100.

The user then pulls the mobile electronic station 100 away from the battery charging system 244. Because the first battery case 200 is not locked or retained in the battery carriage 114 of the mobile electronic station 100, the first battery case 200 remains on the second shelf 252 of the battery charging system 244 at the predetermined position, which enables the second charge device 266 to charge the first battery 202, as described above. Because the second battery case 200 is locked or retained in the battery carriage 114 of the mobile electronic station 100, the second battery case 200 remains on the first battery shelf portion 120 and the second battery shelf portion 122 of the mobile electronic station 100 at the predetermined position where the first conductor 186 and the third conductor 190 of the first electrical connector 180 of the mobile electronic station 100 are coupled to the first conductor 214 and the third conductor 218 of the electrical connector 212 of the second battery case 200, and the second conductor 188 of the first electrical connector 180 of the mobile electronic station 100 is coupled to the second conductor 216 of the electrical connector 212 of the second battery case 200. Accordingly, the second battery 200 supplies electrical power to the voltage conversion circuitry 178, which supplies the predetermined voltage to the computer 156 thereby enabling the computer 156 to operate.

As described above, the user of the mobile electronic station 100 is able swap the first battery case 200 in the mobile electronic station 100 with the second battery case 200 in the battery charging system 244 regardless of whether the first battery case 200 is supported by the first battery shelf portion 120 and the second battery shelf portion 122, or is supported by the third battery shelf portion 124 and the fourth battery shelf portion 126. In addition, the user of the mobile electronic station 100 is able swap the first battery case 200 in the mobile electronic station 100 with the second battery case 200 in the battery charging system 244 regardless of whether the second battery case 200 is supported by the first battery shelf 250 or the second battery shelf 252. This would not be possible if the mobile electronic station 100, the battery charging system 244, the first battery case 200, and the second battery case 200 included conventional electrical connectors each having only two conductors (e.g., one for a positive terminal, and one for a negative terminal) because a proper connection could be established only when the electrical connectors 212 of the first battery case 200 and the second battery case 200 are oriented one direction with respect to the electrical connectors 184, 192 of the mobile electronic station 100 and the electrical connectors 256, 258 of the battery charging system 244.

Because the mobile electronic station 100, the battery charging system 244, the first battery case 200, and the second battery case 200 of the present disclosure include electrical connectors each having three conductors configured as described above, a proper connection can be established when the electrical connectors 212 of the first battery case 200 and the second battery case 200 are oriented at two orientations with respect to the electrical connectors 184, 192 of the mobile electronic station 100 and the electrical connectors 256, 258 of the battery charging system 244. Thus, the mobile electronic station 100 can swap batteries 202 with the battery charging system 244 regardless of the sides of the mobile electronic station 100 and the battery charging system 244 on which the batteries 202 are disposed. This feature enables the battery charging system 244 to be shared by several mobile devices 100, which can swap battery cases 200 with the battery charging system 244 regardless of which the first shelf 250 or the second shelf 252 is unoccupied by a battery case 200 and which is occupied by a battery case 200. Thus, there is no need for a one-to-one correspondence between mobile devices 100 and battery charging systems 244. Accordingly, the battery charging system 244 can be shared by multiple mobile devices 100, which can result in cost savings.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a mobile electronic station including:
  a lower shelf; and
  a battery carriage coupled to a bottom side of a lower shelf;
a battery charging system configured to interact with the battery carriage, the battery charging system including:
  a bottom side;
  a top side opposite to the bottom side;
  a first electrical connector coupled to the top side and including a first conductor, a second conductor, and a third conductor, wherein the first conductor is electrically coupled to the third conductor, and the second conductor is electrically isolated from and disposed between the first and third conductors;
  a second electrical connector coupled to the top side and including a first conductor, a second conductor, and a third conductor, wherein the first conductor is electrically coupled to the third conductor, and the second conductor is electrically isolated from and disposed between the first and third conductors;
  a first suspended shelf between the top side and the bottom side and disposed facing the first electrical connector; and
  a second suspended shelf between the top side and the bottom side and disposed facing the second electrical connector.

2. The system according to claim 1, wherein the first conductor of the first electrical connector, the second conductor of the first electrical connector, the third conductor of the first electrical connector, the first conductor of the second electrical connector, the second conductor of the second electrical connector, and the third conductor of the second electrical connector are parallel.

3. The system according to claim 1, wherein the first and third conductors of the first electrical connector and the first and third conductors of the second electrical connector are electrically coupled to a reference potential.

4. The system according to claim 1, further comprising:
a battery case having a first lid on which a third electrical connector is disposed, the third electrical connector including a first conductor, a second conductor, and a third conductor, wherein the first conductor is electrically coupled to the third conductor, and the second conductor is electrically isolated from and disposed between the first and third conductors, and
wherein the first and third conductors of the third electrical connector are electrically coupled to a first terminal of a battery, and the second conductor of the third electrical connector is electrically coupled to a second terminal of the battery.

5. The system according to claim 4, wherein:
when the battery case is disposed at a predetermined position on the first suspended shelf, the first conductor of the third electrical connector contacts the first conductor of the first electrical connector, the second conductor of the third electrical connector contacts the second conductor of the first electrical connector, and the third conductor of the third electrical connector contacts the third conductor of the first electrical connector, and
when the battery case is disposed at a predetermined position on the second suspended shelf, the first conductor of the third electrical connector contacts the first conductor of the second electrical connector, the second conductor of the third electrical connector contacts the second conductor of the second electrical connector, and the third conductor of the third electrical connector contacts the third conductor of the second electrical connector.

6. The system according to claim 4, wherein the battery case includes a second lid including a surface formed from Teflon, the battery being disposed on the second lid over the surface formed from Teflon.

7. The system according to claim 6, wherein a width of the first suspended shelf is less than a width of the second lid, and a width of the second suspended shelf is less than the width of the second lid.

8. The system according to claim 1, wherein the battery charging system further comprising:
a first charge device configured to provide a charging voltage to the second conductor of the first electrical connector; and
a second charge device configured to provide the charging voltage to the second conductor of the second electrical connector.

9. The system of claim 8, wherein the battery charging system further comprising:
a first sensor electrically coupled to at least one of the conductors of the first electrical connector, wherein the first sensor electrically couples the at least one of the conductors of the first electrical connector to the first charge device when the first sensor is in a first state, and does not electrically couple the at least one of the conductors of the first electrical connector to the first charge device when the first sensor is in a second state; and
a second sensor electrically coupled to at least one of the conductors of the second electrical connector, wherein the second sensor electrically couples the at least one of the conductors of the second electrical connector to the second charge device when the second sensor is in a first state, and does not electrically couple the at least one of the conductors of the first electrical connector to the second charge device when the second sensor is in a second state.

10. The system of claim 9, wherein:
the first sensor is in the first state when a battery is disposed at a predetermined position on the first shelf, and the first sensor is in the second state when the battery is not disposed at the predetermined position on the first shelf, and
the second sensor is in the first state when the battery is disposed at a predetermined position on the second shelf, and the second sensor is in the second state when the battery is not disposed at the predetermined position on the second shelf.

11. A mobile device system comprising:
a mobile electronic station including:
a first shelf;
a battery housing coupled to the first shelf;
a first electrical connector adjacent to the first shelf;
a second electrical connector adjacent to the first shelf;
a first shelf portion and a second shelf portion on the lower side of the battery housing that faces the first electrical connector; and
a third shelf portion and a fourth shelf portion on the lower side of the battery housing that faces the second electrical connector;
a battery charging system including:
a third electrical connector on a top side of the battery charging system;
a fourth electrical connector on the top side of the battery charging system;
a first shelf facing the first electrical connector and suspended between the top side and a bottom side of the battery charging system, the first shelf configured to slide between the first shelf portion and the second shelf portion; and
a second shelf facing the second electrical connector and suspended between the top side and the bottom side of the battery charging system, the second shelf configured to slide between the third shelf portion and the fourth shelf portion.

12. The system according to claim 11, wherein the mobile electronic station further comprising:
a battery lock disposed between the second shelf portion and the third shelf portion, the battery lock configured to selectively retain a battery on one of the first shelf portion and the second shelf portion, or retain the battery on the third shelf portion and the fourth shelf portion.

13. The system according to claim 12, wherein:
the battery lock includes a rod that is pivotally mounted between the second shelf portion and the third shelf portion;
the battery lock also includes a first lever and a second lever mounted to the rod,
when the first lever is in a first position, the battery lock retains the battery on the first shelf portion and the second shelf portion, and
when the first lever is in a second position, the battery lock retains the battery on the third shelf portion and the fourth shelf portion.

14. The system according to claim 11, further comprising a first conductor of the first electrical connector, a second conductor of the first electrical connector, a third conductor of the first electrical connector, a first conductor of the second electrical connector, a second conductor of the second electrical connector, and a third conductor of the second electrical connector are parallel,
wherein the first conductor of the first electrical connector is electrically coupled to the third conductor of the first electrical connector, and the second conductor of the first electrical connector is electrically isolated and disposed between the first and third conductors of the first electrical connector,
wherein the first conductor of the second electrical connector is electrically coupled to the third conductor of the second electrical connector, and the second conductor of the second electrical connector is electrically isolated and disposed between the first and third conductors of the second electrical connector.

15. The system according to claim 11, further comprising a first conductor of the first electrical connector, a second conductor of the first electrical connector, a third conductor of the first electrical connector, a first conductor of the second electrical connector, a second conductor of the second electrical connector, and a third conductor of the second electrical connector, and wherein, the first conductors of the first and second electrical connectors, the second conductors of the first and second electrical connectors, the third conductors of the first and second electrical connectors, the first shelf portion, the second shelf portion, the third shelf portion, and the fourth shelf portion are parallel.

16. The system according to claim 11, further comprising a first conductor and a second conductor of the first electrical connector, and a first conductor and a second conductor of the second electrical connector are electrically coupled together.

17. The system according to claim 11, wherein the mobile electronic station further comprising:
a plurality of wheels of the mobile electronic station supporting the first electrical connector, the second electrical connector, the first shelf portion, the second shelf portion, the third shelf portion, and the fourth shelf portion.

18. The system according to claim 11, wherein:
the first shelf of the mobile electronic station is supported by a plurality of wheels of the mobile electronic station, wherein the first electrical connector, the second electrical connector, the first shelf portion, the second shelf portion, the third shelf portion, and the fourth shelf portion are suspended from the first shelf of the mobile electronic station.

19. The system according to claim 18, wherein:
the first shelf of the mobile electronic station has a first end and a second end, and
the first shelf portion, the second shelf portion, the third shelf portion, and the fourth shelf portion are centered between the first end and the second end of the first shelf of the mobile electronic station.

20. The system according to claim 11, wherein the mobile electronic station further comprising:
an electronic device electrically coupled to the first and the second electrical connectors of the mobile electronic station.

21. The system according to claim 20, wherein the mobile electronic station further comprising:
an image sensor communicatively coupled to the electronic device, wherein the electronic device is a computer.

22. The system according to claim 20, wherein the battery charging system further comprising:
a first charge device configured to provide a charging voltage to a conductor of the third electrical connector; and
a second charge device configured to provide the charging voltage to a conductor of the fourth electrical connector.

\* \* \* \* \*

UNITED STATES PATENT AND TRADEMARK OFFICE
CERTIFICATE OF CORRECTION

| | | |
|---|---|---|
| PATENT NO. | : 11,245,273 B2 | Page 1 of 1 |
| APPLICATION NO. | : 16/282097 | |
| DATED | : February 8, 2022 | |
| INVENTOR(S) | : Prabhu Jyoti et al. | |

It is certified that error appears in the above-identified patent and that said Letters Patent is hereby corrected as shown below:

In the Claims

Column 23, Claim 11, Line 41:
"A mobile device system comprising:" should read: -- A system comprising: --.

Signed and Sealed this
Thirty-first Day of May, 2022

Katherine Kelly Vidal
*Director of the United States Patent and Trademark Office*